(12) United States Patent
Miller et al.

(10) Patent No.: US 7,680,937 B2
(45) Date of Patent: Mar. 16, 2010

(54) CONTENT PUBLICATION

(75) Inventors: John Miller, Cambridge (GB); Aamer Hydrie, Redmond, WA (US); Anders E. Klemets, Redmond, WA (US); Armando Garcia-Mendoza, Cambridge (GB); Christos Gkantsidis, Cambridge (GB); Pablo Rodriguez Rodriguez, Cambridge (GB); Rebecca C. Weiss, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 11/426,820

(22) Filed: Jun. 27, 2006

(65) Prior Publication Data
US 2007/0150596 A1 Jun. 28, 2007

(30) Foreign Application Priority Data

Dec. 22, 2005 (EP) ................................ 05270097
Feb. 28, 2006 (EP) ................................ 06270026
Feb. 28, 2006 (EP) ................................ 06270027

(51) Int. Cl.
*G06F 15/173* (2006.01)
*G06F 15/16* (2006.01)

(52) U.S. Cl. .................. 709/226; 709/224; 709/230

(58) Field of Classification Search ................. 709/224, 709/226, 230
See application file for complete search history.

(56) References Cited

U.S. PATENT DOCUMENTS 7,302,465 B2 * 11/2007 Ayres et al. ................. 709/203

(Continued)

OTHER PUBLICATIONS

Bakker, Arno et al. A Law-Abiding Peer-to-Peer Network for Free-Software Distribution. 2001. IEEE. pp. 1-8 (60-67).*

(Continued)

*Primary Examiner*—Salad Abdullahi
*Assistant Examiner*—Imad Hussain
(74) *Attorney, Agent, or Firm*—Lee & Hayes, PLLC

(57) ABSTRACT

Publishing content using a peer-to-peer content distribution system is described. A publisher is required to request authorization to publish from an authorization body. Resources such as tracker and seed nodes are allocated in a peer-to-peer content distribution system and pre-processing of content to be published is carried out. For example, a content description is generated for each item of content as well as a set of checksums or other items for validating blocks of content. Publication can be terminated in a variety of different ways. For example, by using expiry methods, by active revocation of publishers, authorization bodies, or individual items of content.

20 Claims, 15 Drawing Sheets

U.S. PATENT DOCUMENTS

| | | | |
|---|---|---|---|
| 7,596,625 B2 * | 9/2009 | Manion et al. | 709/232 |
| 2003/0055894 A1 * | 3/2003 | Yeager et al. | 709/204 |
| 2003/0056094 A1 * | 3/2003 | Huitema et al. | 713/157 |
| 2003/0120928 A1 * | 6/2003 | Cato et al. | 713/176 |
| 2003/0204742 A1 * | 10/2003 | Gupta et al. | 713/200 |
| 2003/0236847 A1 * | 12/2003 | Benowitz et al. | 709/206 |
| 2003/0236976 A1 * | 12/2003 | Wheeler | 713/158 |
| 2004/0098447 A1 * | 5/2004 | Verbeke et al. | 709/201 |
| 2004/0196842 A1 | 10/2004 | Dobbins | |
| 2005/0071280 A1 | 3/2005 | Irwin et al. | |
| 2005/0080858 A1 * | 4/2005 | Pessach | 709/206 |
| 2005/0198061 A1 * | 9/2005 | Robinson et al. | 707/102 |
| 2005/0203851 A1 * | 9/2005 | King et al. | 705/51 |
| 2006/0020560 A1 | 1/2006 | Rodriguez et al. | |
| 2007/0074019 A1 * | 3/2007 | Seidel | 713/156 |
| 2009/0138486 A1 * | 5/2009 | Hydrie et al. | 707/10 |
| 2009/0198825 A1 * | 8/2009 | Miller et al. | 709/230 |

OTHER PUBLICATIONS

Popescu, Bogdan et al. A Certificate Revocation Scheme for a Large-Scale Highly Replicated Distributed System. 2003 IEEE. Proceedings of teh 8th IEEE ISCC. pp. 1-7.*

"BitTorrent", Retrieved on Aug. 8, 2006 at http://en.wikipedia.org/w/index.php?title=BitTorrent&oldid=32277833>, Wikipedia, Dec. 2005, pp. 14.

European Search and Examination Reports dated Jun. 29, 2006, in counterpart European Patent Application No. 05270097 (four pages).

* cited by examiner

CONTENT PUBLICATION

CROSS-REFERENCE TO RELATED APPLICATION(S)

This application claims priority from European patent application number 05270097.8 filed on Dec. 22, 2005.

This application claims priority from European patent application number 06270026.5 filed on Feb. 28, 2006.

This application claims priority from European patent application number 06270027.3 filed on Feb. 28, 2006.

TECHNICAL FIELD

This description relates to content publication in a peer-to-peer content distribution system.

BACKGROUND

Content distribution systems have been developed to enable data such as software updates and critical patches to be distributed to nodes in a network. Typically these systems comprised many servers which were placed in the network, with nodes connecting directly to one of the servers to download the required file. However, such systems are constrained by the connection bandwidth to the servers and require considerable investment to increase the capacity of the system. Consequently, content distribution systems have been developed which rely on a fully distributed architecture with nodes in the network participating in the distribution process. Such systems may be referred to as peer-to-peer or peer-assisted content distribution systems. In such a system, the server may divide the file to be distributed into a number of blocks and provide these blocks to nodes in the network. As soon as a node has received one or more blocks, the node can act as a source of the received blocks for other nodes whilst concurrently receiving further blocks until they have received all the blocks of the file.

Malicious users can cause problems for such systems in many ways. These include distribution of false content (i.e. content which is not what it purports to be). This false content may include viruses or other harmful programs or may just waste network resources sharing data which is unwanted. Malicious users may distribute corrupted downloaded data which may then be distributed by other peers who are unaware that it is corrupted. This may result in such large scale dissemination of corrupted data that the distribution of a particular piece of data is impossible. There exists a need to quickly identify malicious users and prevent or mitigate operation of those users.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Publishing content using a peer-to-peer content distribution system is described. A publisher is required to request authorization to publish from an authorization body. Resources such as tracker and seed nodes are allocated in a peer-to-peer content distribution system and pre-processing of content to be published is carried out. For example, a content description is generated for each item of content as well as a set of checksums or other items for validating blocks of content. Publication can be terminated in a variety of different ways. For example, by using expiry methods, by active revocation of publishers, authorization bodies, or individual items of content.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
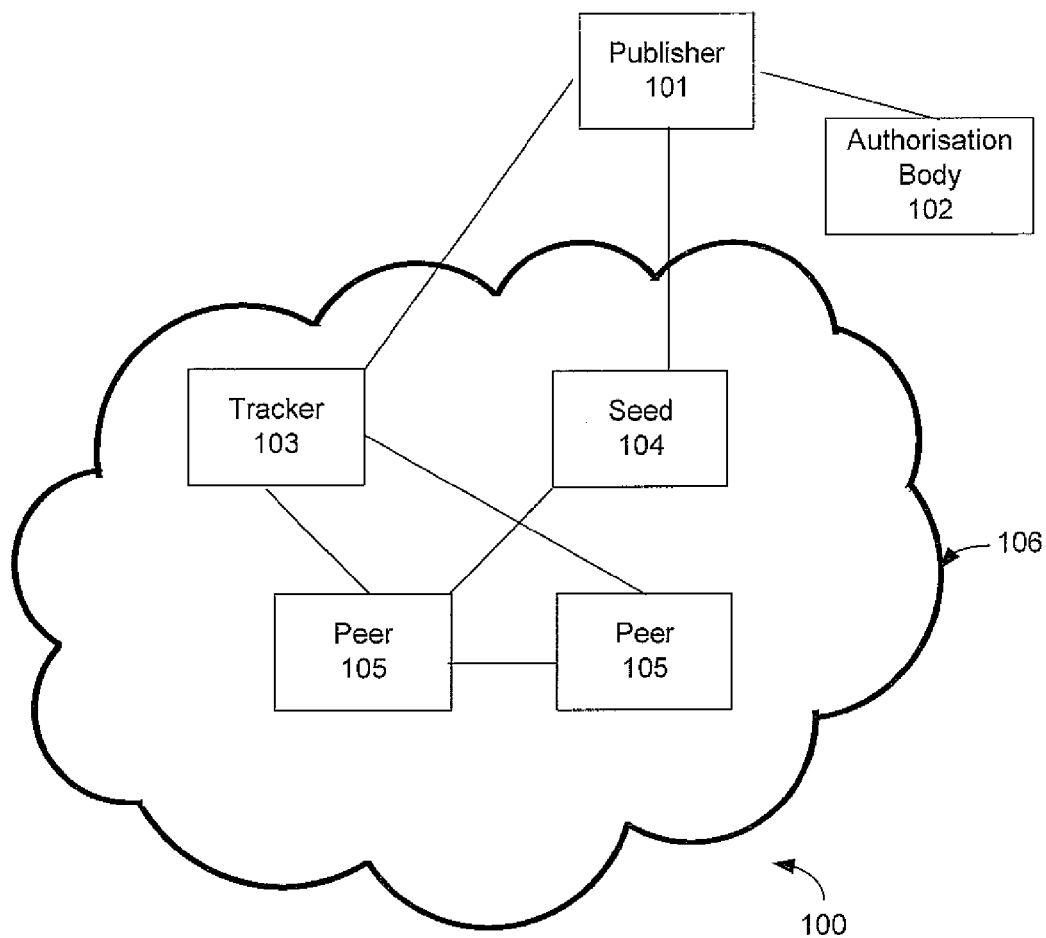
FIG. 1 is a schematic diagram of a content distribution system.

FIG. 1 is a schematic diagram of a content distribution system 100 which comprises a publisher 101, an authorisation body 102, a tracker 103, a seed 104 and two peers 105. Content distribution occurs within the cloud 106. The content may be any type of data and may be distributed, for example, as encoded blocks. The publisher 101 is the entity which provides the content and which is authorised by an authorisation body 102. The publisher may be a user or corporation and may lie outside the content distribution cloud 106. The tracker 103 is a server which helps peers 105 find other peers that are participating in the distribution of a particular piece of content. The seed 104 is a client which is usually always on and is where the publisher places a piece of content for subsequent distribution within the system. A seed 104 uploads the content to a small number of peers 105 in the system 100 (this may be to as few as a single peer) but does not download the same content from other nodes in the system. The term 'node' is used herein to refer to any logical entity within the system. A peer 105 is a client which is interested in obtaining the content held by the seed 104. A peer will download the content from nodes (i.e. peers or seeds) in the system and may also upload those parts of the content that it has received to other peers in the system. A peer may act as a temporary or virtual seed once it has received all the particular piece of content, by making the content available for uploading to other peers in the system, whilst no longer downloading the content from peers. The content may be distributed within the cloud in an encoded format or alternatively the content may be not be encoded. FIG. 1 shows some logical connections between parts of the system 100, however those shown are not exhaustive and are for illustration purposes only.

Figure 2:
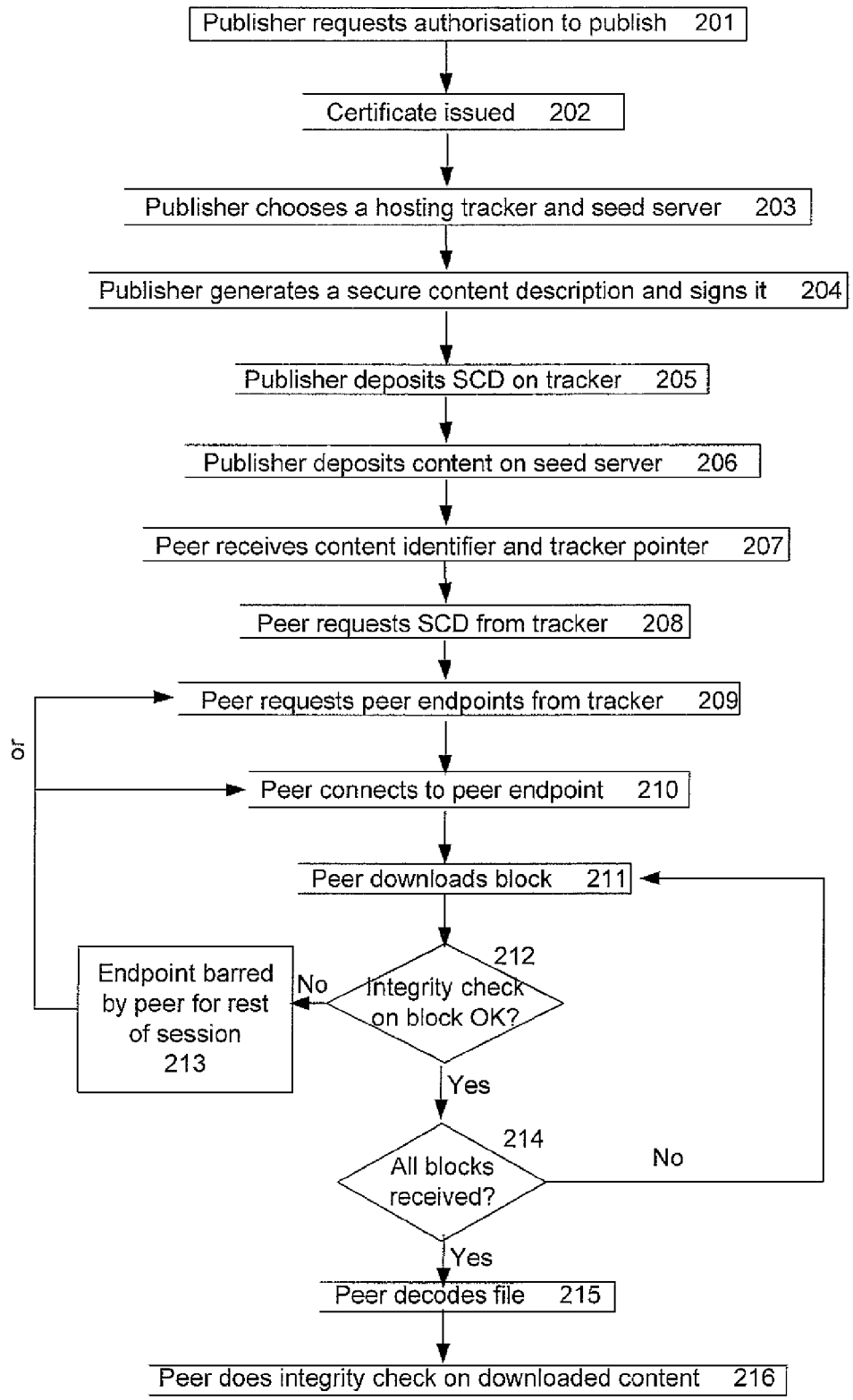
FIG. 2 is an example flow diagram showing the operation of the system of FIG. 1.

An example of the operation of the system 100 shown in FIG. 1 can be described with reference to the flow chart shown in FIG. 2. The publisher 101 requests authorisation to publish from the authorisation body 102 (step 201). This process of requesting authorisation to publish (step 201) can comprise for example, providing proof of the publisher's identity to the authorisation body 102. The authorisation body verifies the publisher's validity as a potential publisher and checks the publisher's business contact information. For example, checks are made to ensure there is no reason to prevent the publisher from publishing, such as a history of distributing pirated content or breaking content distribution laws. In addition, the process of requesting authorisation to publish (step 201) can comprise agreeing to publication authorisation terms. For example, these terms can include agreement that the publisher's right to publish may be revoked at any time if the publisher is found to have broken the terms of the publication agreement. In response to this, the authorisation body issues a certificate (step 202). This certificate may be specific to a piece of content or the certificate may not relate to any particular piece of content and may be used by the publisher when publishing any piece of content in any content distribution cloud. In one example, the publisher has a unique cryptographic identity. This is either generated by the publisher itself or is pre-existing at the publisher. For example the cryptographic identity comprises an asymmetric key pair such as an RSA key pair. The publisher 101 now chooses a hosting tracker 103 and a seed server 104 (step 203) and generates a secure content description (SCD) which it digitally signs (step 204). The SCD includes details of the certificate issued to the publisher (in step 202 above) and information to enable integrity checking of the downloaded content. The SCD will be described in more detail below. The content distribution cloud 106 is then established by the publisher depositing the signed SCD on the tracker 103 (step 205) and the content on the seed server 104 (step 206). A peer 105 receives a content identifier and a tracker pointer (step 207). This information may be received from a website, URI (Uniform Resource Identifier) or as part of an application experience (e.g. as part of an Interactive Media Player, iMP). Using this information, the peer 105 can request a SCD from the identified tracker 103 (step 208) and then request details of peer endpoints from a tracker (step 209). These peer endpoints are details of one or more other peers which the peer can connect to in order to download the content. The peer endpoints may also include details of the seed 104, particularly in the early stages of a cloud 106 when there are not many peers within the cloud. The peer 105 then connects to one or more of the identified peer endpoints (step 210) and downloads a block of the content (step 211. Before adding the block to the peer's store of received blocks or forwarding it to anyone else, the integrity of the block is verified (step 212). If the integrity of the block is found to be suspect, the peer makes a note of the offending peer endpoint and will not contact it or accept connections from it for the remainder of the content distribution session (step 213). Instead, the peer will connect to another peer endpoint (step 210) and if necessary will first request further details of peer endpoints from the tracker (step 209). If the integrity of the block is verified (in step 212), the peer determines whether it has received all the required blocks of the content (step 214). If it still requires additional blocks, it will proceed to download another block (step 211). Once the peer has downloaded all the required blocks of the content, the peer decodes the file (step 215) and does an integrity check on the downloaded content (step 216). Further detail on the individual steps is provided below.

By authorising the publisher, the other nodes in the content distribution system can have confidence that the content being published is likely to be that which they expect. The nodes can, if they wish, also check that the authorisation of the publisher is still valid. Furthermore, if a publisher is found to be publishing invalid, illegal, offensive or other objectionable content, the authorisation can be revoked, therefore preventing the publisher from publishing further content. Once a publisher has had their authorisation revoked, further dissemination of the content in the cloud 106 can be restricted by the tracker and once a peer becomes aware of the revocation, they may cease their activity within the cloud, as described in more detail below.

The request for authorisation to publish (step 201) may be made by applying for authority from a certification authority (CA) such as Microsoft's (trade mark) certification authority. In some cases, the CA with the root credentials (e.g. Microsoft (trade mark)) may authorise a publisher to sub-authorise publishers and they may in turn also be able to authorise sub-publishers. For example, the CA may authorise a publisher (for example, a fictitious publisher called 'Publisher 1') and may allow them to sub-authorise parts of the organisation (e.g. 'Publisher 1-news' and 'Publisher 1-comedy') as publishers. This process of sub-authorisation may also be referred to as delegation.

The certificate issued (in step 202) in response to the request (in step 201) may take the form of an X.509 certificate. X.509 is an ITU-T (the International Telecommunication Union's Telecommunication Sector) standard for public key infrastructure (PKI). The certificate may be provided to the publisher 101 or may be stored in a central repository (not shown in FIG. 1) and details provided to the publisher 101. Any other suitable authorisation method could be used instead of X.509 certificates including other certificate schemes, shared secrets and derived tokens.

The selection of a hosting tracker (step 203) may involve the publisher setting up their own tracker server or obtaining permission to use a third party tracker server. The tracker 103 is optionally also authorised by the CA so that a peer can be confident of the integrity of the information obtained from a tracker. The seed 104 which is selected (also in step 203) may offer the content to peers within the cloud using any suitable protocol, including, but not limited to, any Avalanche-supported protocol, BitTorrent and http (hyper text transfer protocol). Avalanche is a peer-assisted content distribution protocol developed by Microsoft Corporation (trade mark) which uses network coding (e.g. full network coding or group network coding). This means that each node in the system generates and transmits encoded blocks of information, these newly encoded blocks being a linear combination of blocks currently held by the particular node. One of the benefits of such a protocol is that it minimises the probability that a particular part (or block) of the content is or becomes rare in the network.

At least one seed is allocated by the publisher for each item of content to be published. Also, at least one tracker is allocated by the publisher for each item of content to be published. Additional seeds and or trackers can be allocated to improve robustness and scalability. Also, the same host can act as a seed or tracker for different items of content offered in different content distribution clouds.

The publisher prepares the content for publication. For example, the publisher optionally evaluates security needs for content consumption and prepares the content with Digital Rights Management (DRM), activation technology or other suitable security means for preventing unauthorized consumption. The publisher, as part of the content preparation process, may also generate a content description such as an SCD and in addition generate a set of SRCs (secure random checksums) for block validation.

The secure content description (SCD) generated by the publisher (in step 204) is a self-certifying structure describing the content publisher and enabling validation of transmitted and reassembled content. The term 'self-certifying' is used herein to refer to the fact that the structure contains its own proof that it has not been tampered with, for example it may have a cryptographic signature which ensures that the content has not been tampered with. The SCD does not need to be encrypted, but some or all of it could be encrypted in some examples. The SCD may include some or all of the following:

A publisher identifier, such as the certificate thumbprint or Common Name (CN) of a content publisher or the publisher's encoded X.509 certificate.

A hash algorithm and hash value for the decoded content.

A unique identifier for the content. This is typically the value of the content hash.

Transfer settings required to specify homomorphic hashes, such as number of blocks and encoding algorithm.

Homomorphic hash algorithm specifications and values.

One or more seed endpoint descriptions.

One or more tracker endpoint descriptions.

Metadata describing the content properties, including suggested file name, file length, media type, rating, originator (which can be distinct from the publisher) etc.

The SCD is signed by the publisher (in step 204) for example using the publisher's private key which can be validated by a public key traced to the root CA via a valid certificate chain. An example of a certificate chain is as follows:

Microsoft holds root certificate

'Publisher 1' issued certificate by Microsoft on Sep. 9, 2005, expires Sep. 9, 2006, can delegate (i.e. can sub-authorise)

'Publisher 1-news' issued certificate by 'Publisher 1' on Oct. 9, 2005, expires Sep. 9, 2006, cannot delegate When the signed SCD is deposited by the publisher on to the tracker (step 205), the tracker may confirm that the publisher is still authorised by the CA. This may be achieved by the tracker confirming that the publisher is not on the Certificate Revocation List (CRL) published by the entity that issued the certificate to the publisher. The CRL lists certificates that although previously issued have subsequently been revoked by the CA or delegate (i.e. by the certificate issuing entity). The tracker 103 may hold copies of CRLs locally, but ideally checks with CAs or their delegates for updated CRLs regularly (e.g. every 15 or 30 minutes) to minimise the window of vulnerability. The certificate chain may include details of where the master CRL is located for each authorising entity (e.g. a url IP address or other endpoint description). As anyone who can issue a certificate can also revoke certificates that they issued, it may be necessary to check more than one CRL. For example, in the example certificate chain given above, CRLs are published by both Microsoft and 'Publisher 1'. Each CRL includes (either in the list or in associated information) details of when the CRL was last updated and how regularly the CRL should ideally be rechecked (e.g. "Updated 10 Oct. 2005 at 16.09. Re-check every 2 hours"). The CRLs are created in such a manner that they cannot be edited by anyone other than the issuing entity (i.e. the CA or their delegate). For example, only Microsoft (trade mark) can amend their CRL which lists certificates Microsoft (trade mark) originally issued but have subsequently been revoked and only 'Publisher 1' can amend their CRL which lists certificates that 'Publisher 1' initially issued, as a delegate for Microsoft, but that 'Publisher 1' has subsequently revoked.

If a tracker, when checking a CRL, identifies that the publisher of a piece of content has had their authorisation revoked, the tracker may stop distributing the SCD (in step 208) and details of peer endpoints (in step 209).

Having established the cloud (in steps 205 and 206), the publisher 101 may play no further part in the content distribution process. However, the publisher may in another example, update and reissue the SCD (e.g. by repeating steps 204 and 205) whilst the content is being distributed within the cloud 106.

The content identifier and tracker pointer (received in step 207) may be in the form of a URI such as: avalanche://mytracker.microsoft.com/0123456789ABCDEF0123456789ABCDEF In another example both the content identifier and tracker pointer may be provided in a single 128 bit identifier. In another example, the information may be provided in a small file (e.g. via a web download) with a locally registered type which, when downloaded and activated, invokes the content distribution client e.g. Avalanche. The content identifier and tracker pointer may include details of the certificate issued to the publisher.

The tracker pointer may be a pointer to an IP (internet protocol) address, a DNS (Domain Name System) entry or use any other method of specifying a network endpoint. Use of a DNS entry may be advantageous because it provides flexibility and scalability of routing. For example the DNS server can direct the peer to an IP address of a tracker which is not hardwired into the tracker pointer and may change. This is beneficial where there may be several tracker servers and the DNS server can direct peers to different servers in sequence to share the load. Furthermore, use of a DNS entry allows for additional trackers to be added or for trackers to be taken offline for maintenance, if required, without the need to change the tracker pointer.

The content identifier and tracker pointer may be actively retrieved (in step 207) by the peer and this may be initiated by a user input at the peer or by an application running on the peer. In an example, the peer may receive the content identifier and tracker pointer in response to obtaining authorisation to participate in the cloud 106, for example by purchasing the right to particular content (e.g. the right to download a film may be purchased from an online store). Such authorisation may be in the form of a certificate, a shared secret, a derived token or any other suitable authorisation method. In another example, the content identifier and tracker pointer may be pushed to the peer, for example to an application such as a media player running on the peer. The push may be in response to a previous indication of interest from the peer, e.g. a peer may indicate the types of news items, audio clips or video clips which are of interest and then when content which fits the criteria becomes available, the content identifier and tracker pointer may be pushed to the peer.

When the peer 105 requests the SCD from the tracker (in step 208), the peer and the tracker may be required to mutually authenticate to prove that each is authorised to perform these roles of peer and tracker (as described in more detail below). However, in another example the SCD may be considered public information and the mutual authentication may occur at a later stage (in step 209) prior to exchange of more private information. On receipt of the SCD, the peer obtains information on the publisher's certificate chain (as described above). At this point, the peer may also retrieve a Certificate Revocation List (CRL) issued by the authority which issued the certificate to the publisher to ensure that the publisher is still authorised. As described above, a copy of the CRL may be stored at the tracker along with details of how up to date the CRL copy is. The peer may retrieve a copy of the CRL stored at the tracker or alternatively may retrieve a copy of the CRL master from the authorising body which issues the list. The CRL is likely to be a file on the order of kilobytes or tens of kilobytes. The peer may not necessarily download an updated CRL before every connection and may instead only download a new CRL when they join a new content cloud 106. By connecting to the tracker 103 to retrieve the CRL, rather than the certificate issuing body, the peer may avoid a potential bottleneck in the system. If a peer, when checking a CRL, identifies that the publisher of a piece of content has had their authorisation revoked, the peer may end its participation in the cloud and not download further blocks. The peer may also delete any blocks of the content that they have already received.

The tracker from which the peer requests the SCD (in step 208) may be the same or different to the tracker from which the peer requests information on peer endpoints (in step 209). Where the two trackers are different, the information on the second tracker, from which the peer requests information on peer endpoints (in step 209), may be identified in the SCD provided by the first tracker, (see description of the SCD above).

Before the peer can obtain information on peer endpoints for the content cloud from the tracker (in step 209), the peer authenticates the tracker or alternatively, mutual authentication may occur between the tracker and the peer. This authentication may occur earlier in the process (e.g. in step 208) or may occur at this stage. The authentication process confirms to the peer that the tracker is an authorised tracker by sharing details of the trackers authorisation by a CA. Again the peer may choose to consult the relevant CRL. This prevents rogue trackers from being established within the cloud. If mutual authentication occurs, the tracker is also able to identify the peer (e.g. using a unique host identifier), although it may not be necessary for the peer to have a specific authorisation to participate in a cloud. The use of a unique peer identification mechanism enables the tracker to determine if a peer is making multiple requests for peer endpoint information, which may indicate that the peer has a malicious intent. The tracker may for this reason, or any other, decide to block a peer from a content cloud. The peer identification may be allocated to a peer for use in all situations (e.g. all clouds that they join) or may be allocated on a more regular basis (e.g. per cloud, per publisher, per network provider, per month etc).

The tracker may provide a peer with peer endpoint information (in step 209) for randomly selected peers, for peers selected according to a locality algorithm or peers selected according to any other criteria (e.g. connection speed of the peer). The tracker may limit the number of peers that it provides information on to any one peer and may also limit the regularity with which a peer (e.g. referenced to a host identifier) can request peer endpoint information (e.g. a limit of information on 10 peers every 15 minutes). This is to mitigate information disclosure, because the peer endpoint information is potentially sensitive and would be useful to a malicious user or to an advertiser. The peer endpoint information may comprise:

One or more network endpoint descriptions, such as an IP endpoint or a URL (uniform resource locator).

A content cloud identifier describing the content cloud the endpoint is participating in.

A host identifier (preferably unique to that host).

Where peers are randomly selected, the tracker may include the seed 104 as a peer with a probability of 1/k, where k is the number of active peers in the cloud including the new peer.

When a peer (e.g. peer A) connects to one or more of the other peers (e.g. peer B) that the tracker has identified as being part of the content cloud 106, the peer (peer A) may perform authentication with the other peers (peer B). Although there is not necessarily an equivalent of a CRL for peers, the peers may identify each other by their host identifier or by an authorisation issued to allow the peer to participate in the cloud. The authentication between peers is beneficial so that a peer (peer A) can identify a peer (peer B) that provides it with an invalid block of data and can then block further communication with that peer for the remainder of the session (see steps 212 and 213). The authentication may also assist in preventing denial of service attacks mounted on a peer by a malicious peer by making multiple aborted or slow connections between the peer and the malicious peer. Through the authentication process, a peer may identify that the same peer is making multiple connection requests and then block some or all of those connections. The authentication between peers may also include providing information on where the peer that initiates the connection (peer A) obtained details of the other peer (peer B) from, e.g. the details of the tracker providing the peer endpoint information. This may permit a peer to check the authorisation of that tracker prior to initiating transfer of blocks between the peers.

A peer may connect to one or more other peers (in step 210) within the cloud 106 in order to obtain parts of the content. A limit may be set on the number of peers that a peer may connect to at any one time (e.g. 1 peer may connect to no more than 14 other peers). This limit may effectively be set by the limit on the number of peer endpoint details provided to the peer by the tracker (in step 209) or the limit may be set independently by the tracker, the publisher or the peer.

Whilst peers may authenticate each other, as above, the transmissions between them (e.g. in step 211) are not necessarily encrypted. Peers may, if required, negotiate a session key for privacy and apply a stream cipher Having received a block (in step 211), a peer may check the integrity of that block for example using a hash function, such as a homomorphic hash function. Details of the hash function(s) used for the individual blocks of content and the content as a whole may be provided to the peer in the SCD, as described above. In another example, the homomorphic hashes may be transmitted independently from the SCD. Hash functions map a large block of information, b, to an output h(b) typically of much smaller size. The hash function has the property that given a block b, it is computationally infeasible to find another block, b', with the same hash value, i.e. where h(b)=h(b'). This means that by checking that the calculated hash function of a received block of data matches the expected hash function, the peer can be relatively confident that the block received is the correct block and that the block has not been tampered with. Homomorphic hash functions have the additional property that the hash value of a linear combination of some input blocks can be constructed efficiently by a combination of the hashes of the input blocks. Consequentially, use of homomorphic hash functions is particularly suited to content distribution protocols that use network coding, such as Avalanche.

Other methods of checking the integrity of blocks can be used. For example, in the case that network coding is used (either full network coding or group network coding) a homomorphic hash or secure random checksum (SRC) method may be used. In the case that no network coding is used on a regular checksum or simple hash can be used or alternatively insert an SRC or homomorphic hash method. More detail about SRCs is given below.

Once a peer has downloaded a block (in step 211) or alternatively, after the integrity of the block has been checked (in step 212), the tracker adds that peer to a list of active peers in the cloud and then may subsequently provide details of that peer to other peers in subsequent requests for peer endpoint information received from other peers that wish to participate in the cloud. In order for the peer to be added to the list of active peers in a cloud, the peer may be required to register with the tracker to identify that they have received some content. In other examples, the peer may be added to the list before it has downloaded a block, for example, when it has requested the SCD.

Having received all the required blocks for the content (step 214), the peer decodes the content, or otherwise reconstructs it where the content was not encoded (step 215). Before using the content or making it available to third parties, the peer does a final integrity check on the whole content (in step 216). The final integrity check may also involve checking that the calculated hash matches the expected hash (as described above with reference to step 212). Details of the expected hash, or parameters to enable it to be calculated, may be provided in the SCD.

The above description describes the use of hash functions and homomorphic hash functions by way of example only. Other techniques may alternatively be employed by the peer to enable them to determine with a high degree of confidence both that the individual parts of the content (e.g. the individual blocks) and the whole content received are valid and have not been tampered with (i.e. in steps 212 and 216).

Figure 3:
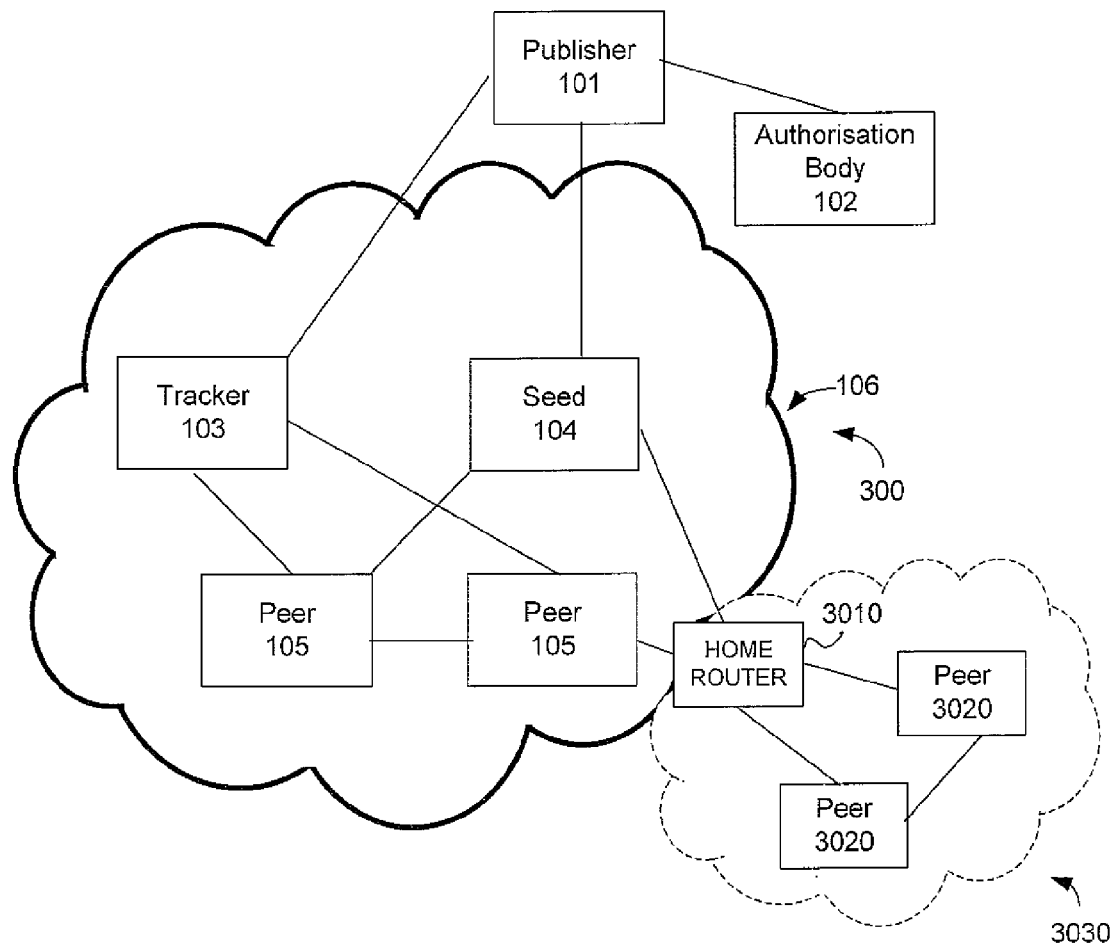
FIG. 3 is a schematic diagram of another content distribution system.

FIG. 3 shows a schematic diagram of a second content distribution system 300, which includes, in addition to the elements described above in relation to FIG. 1, a home router 3010 and two peers 3020 on a home network 3030. The home router 3010 performs network address translation. The home network 3030 provides an extension to the content distribution cloud 106 and the two peers 3020 on the home network 3030 can distribute content between themselves and can also each maintain separate connections to peers within the cloud 106. This is because although the peers 3020 on the home network may appear to have the same IP address as far as peers 105 outside the home network are concerned, they will be connected to the router via different ports. In another example, the network 3030 could comprise a corporate network.

FIGS. 1 and 3 each show a single cloud 106. A peer may however be connected to more than one logically distinct cloud and many of the peers and trackers may be common between clouds. Each logically distinct cloud has one publisher and a publisher may be responsible for several clouds. A peer in one cloud may be acting as a seed in another cloud, or even acting as a tracker server. The terms 'seed', 'peer' and 'tracker' are used to define the role being played by the node in the cloud in question and the terms do not necessarily imply specific hardware requirements. For example, the seed, peer and tracker may each comprise a personal computer. Within the same cloud, a physical node may be performing more than one logical role, e.g. seed and tracker.

In the above examples, peers may be able to join any cloud or they may require specific authorisation to join a cloud, e.g. by purchasing the right to a particular download. The publisher 101 or other entity may set criteria for participation in a cloud. For example, only subscribers to a particular network or service may be eligible to participate in a cloud. In another example, the cloud may have minimum bandwidth requirements such that only peers who have connections that exceed a certain bandwidth (e.g. 512 MBit/s) may be allowed to participate in a cloud. In a further example, certain quotas may be associated with a cloud, for example detailing the total number of peers that can participate in a cloud or the maximum number (or proportion) of peers with a slow connection that can join a cloud.

The content described herein may be any kind of data including, but not limited to, software, data files, audio media and video media.

The above methods provide confidence that the content provided will be what is expected, however, they do not prevent misuse of non-public content. Consequently, additional protection may be provided in the form of license activation codes for software and DRM (Digital Rights Management) for audio and video media.

Figure 4:
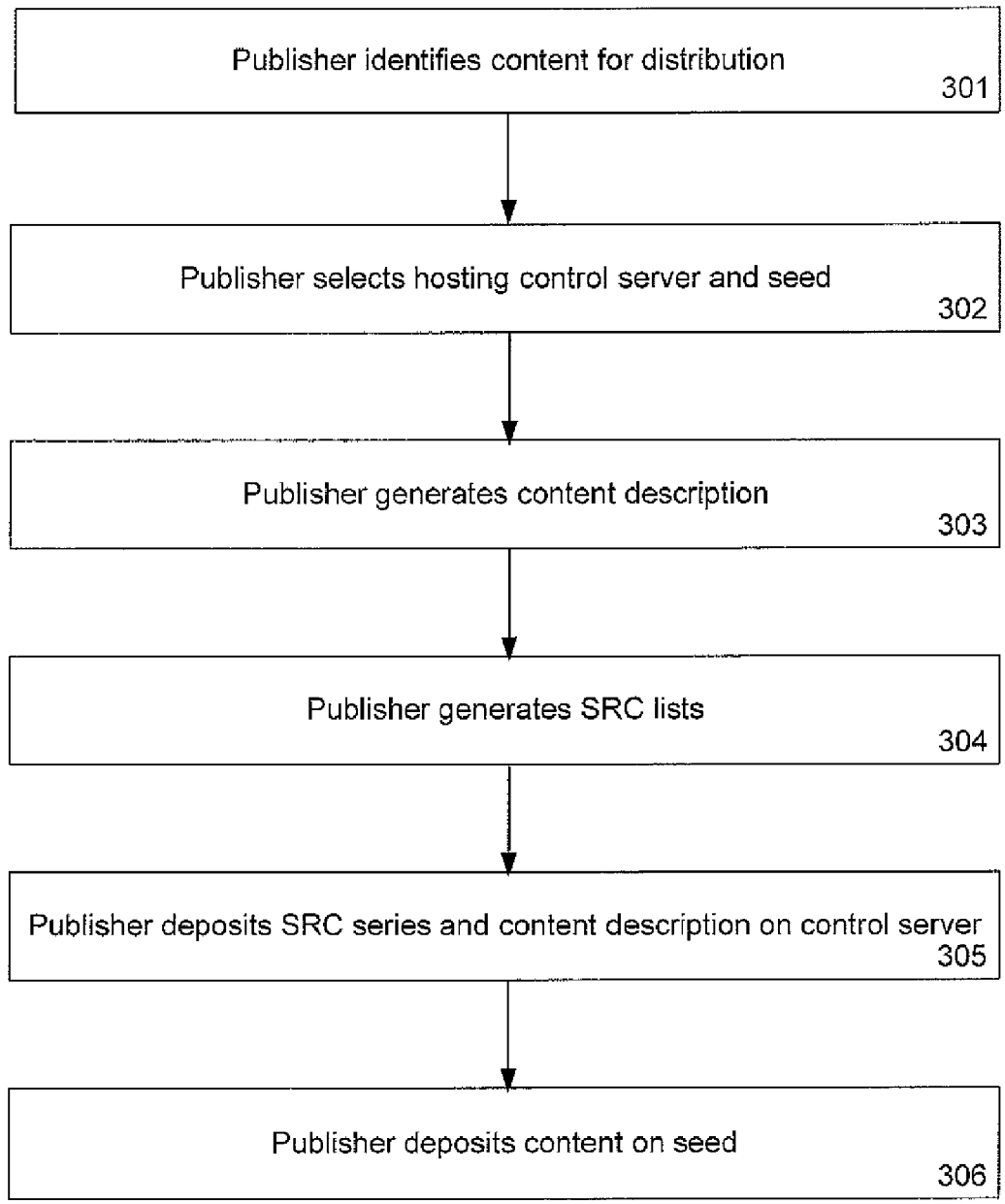
FIG. 4 shows an example flow diagram for the operation of a node in the system of FIG. 1.

An example of the operation of the system 100 shown in FIG. 1 using SRCs is now described with reference to FIGS. 4-9. As shown in FIG. 4, the publisher 101 identifies the content to be distributed (step 301) and selects a tracker 103 and a seed 104 (step 302). The publisher generates a content description which it may digitally sign (step 303). The content description may include one or more of: a publisher identifier, an identifier for the selected tracker, an identifier for the selected seed, a unique identifier for the content and information to enable integrity checking of the downloaded content. The publisher also generates a number, N, of secure random checksum (SRC) lists (step 304), for example 1000 SRC lists. These SRC lists and methods for generating them are described in more detail below. Having generated the content description and SRC lists (in steps 303 and 304), the content description and SRC series (one series for each list)

are deposited on the tracker 202 (step 305). In one example, an SRC series (also referred to as a 'data set') comprises an SRC list and the numerical seed used to create the SRC list, as described in more detail below with reference to FIG. 5. An SRC series may also include the unique identifier of the content to which it relates. This provides a means to correlate the content description and SRC series for the same piece of content. In addition (or instead) the content description and SRC series may be digitally signed using the same key. The publisher may also provide the tracker with additional information relating to how the SRC series should be provided to peers, as described below. In order to enable the distribution of content, the particular piece of content for distribution is deposited on the seed server 104 (step 306). Having deposited the information on the tracker 103 and the seed 104, the publisher 101 may play no further part in the content distribution process. However, the publisher may update and reissue the content description or generate additional SRC lists if required whilst the content is being distributed.

The term 'checksum' is used herein to refer to a computed value for a piece of data (e.g. a block of data) that is dependent upon the contents of the data. The checksum may be computed in any way and may take any form. The term 'random checksum' is used herein to refer to a checksum (as described above) which is computed using one or more random or pseudo-random numbers. Secure random checksums (SRCs) can be used to validate network encoded data by providing the ability to detect corruption in transferred blocks, i.e. they can be used to determine whether an encoded block has a valid relationship to the source (uncoded) blocks from which it claims to be derived. The SRC values for appropriate encoded blocks can be combined in a manner related to the way the uncoded blocks were combined to make the encoded block. This process is described in more detail below. Homomorphic hash algorithms can also be used to detect corruption in transferred blocks, however SRCs have significantly improved performance, for example, the evaluation of the correctness of a block may be achieved around ten times faster using SRCs compared to using a homomorphic hash.

Figure 5:
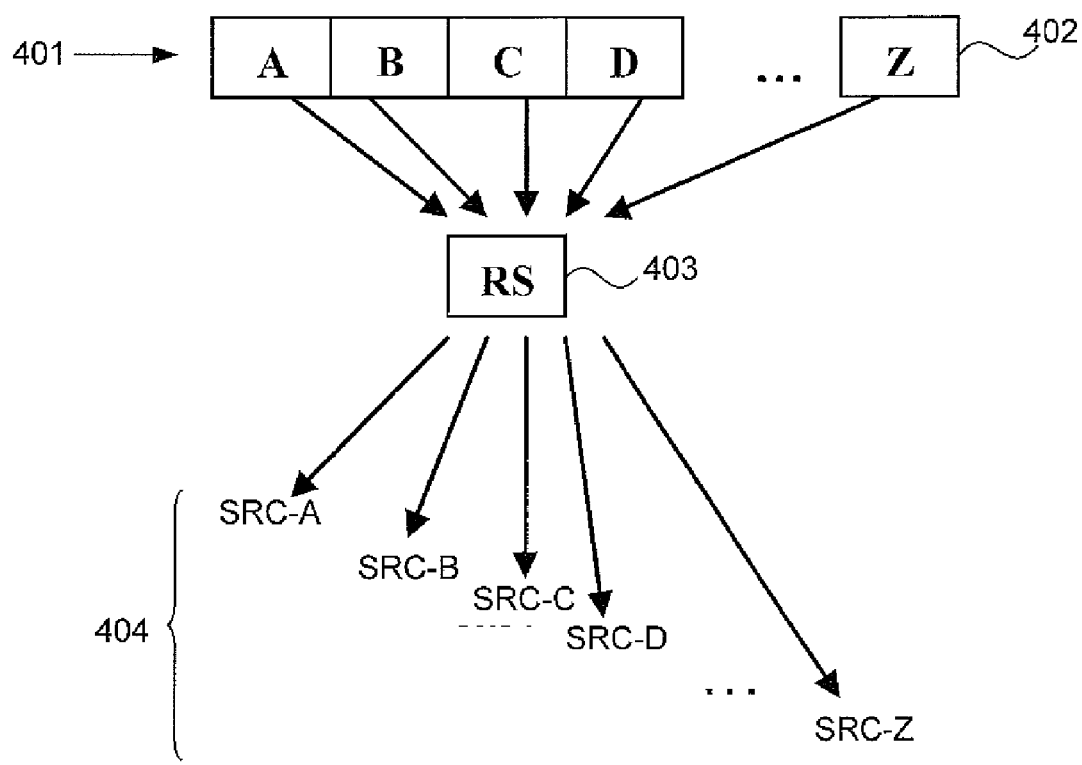
FIG. 5 is a schematic diagram showing the generation of SRC series.

The generation of SRCs can be described with reference to FIG. 5. For file distribution, the content (also referred to as the 'source file') is divided up into a number of pieces, referred to as blocks. For example, a 4 GB file may be divided into 2048 blocks each of which is 2 MB in size. For purposes of explanation, FIG. 5 shows a content file 401 which has been divided into 26 blocks 402, labelled A to Z. An SRC for each uncoded block A-Z is calculated by first seeding a random number generator with a known seed (e.g. 0x38572BEF01547B2C) to generate a deterministic sequence of pseudo-random numbers the size of a single block, referred to as a random stream (RS) 403. The seed may be, for example, a 32-bit or a 64-bit seed. The sequence of pseudo-random numbers 403 is then combined with the sequence of bytes in the first uncoded block (block A) to calculate the SRC for that block (SRC-A). A simplified example of this calculation is shown below:

Block A comprises bytes $B1, B2 \ldots, Bn$
The RS comprises pseudo-random numbers $R1, R2 \ldots, Rn$
$SRC\text{-}A = (B1.R1) + (B2.R2) + \ldots + (Bn.Rn)$ These arithmetic operations all take place within a finite field, also referred to as a Galois field, (typically $2^{16}$, referred to as a 16-bit Galois field). The calculations are then repeated for each of the blocks in turn (from block A to block Z) to create a list of SRCs 404 comprising one SRC for each uncoded block (SRC-A to SRC-Z). In this example the SRC series comprises an SRC list and the numerical seed used in the generation of that SRC list, (note that this numerical seed is not related in any way to the seed 104 which is a server). In this example, the random stream (RS) is not included in the SRC series and hence is not stored on the server and provided to peers 105. In another example, the random stream may be provided within the SRC series instead of (or in addition to) the numerical seed. However, as the random stream is much larger than the numerical seed, this is much less efficient (e.g. more storage and transmission space is required). It may be beneficial in some examples, however, to provide the random stream in the SRC series, for example when the stream is truly random and so is not reproducible with a known algorithm and seed. A peer 105 can regenerate the stream of pseudo-random numbers using the seed contained within the SRC series, as is described below.

Having generated one SRC list, as described above, further SRC lists can be generated using different seeds input to the random number generator to create the random stream. As described above, a publisher may create a large number, N, of SRC lists, e.g. N=1000.

In addition to providing the tracker with the SRC series (in step 305), the publisher may also deposit information on how the SRC series should be distributed to peers. This additional information may include a number, K, of SRC series which should be given to each peer and a method to use to select the K SRC series from the total number, N, of SRC series generated by the publisher and deposited on the tracker.

The publisher may select values of N and K based on several factors including, but not limited to, resistance to a malicious attack, probability of a corrupted block not being detected, processing resources for calculation of SRC series and bandwidth for distribution of SRC series. The publisher can select values of N and K to give a degree of risk that meets their security requirements. In addition to selecting N and K, the size of the seed used to generate the SRC values may be selected, with larger seeds providing more resistance to malicious attacks than smaller seeds (e.g. a 64-bit seed compared to a 16-bit seed). This is because it becomes computationally unfeasible for a malicious user to request enough SRC lists or to calculate enough SRC lists once they have the full content. This means that it is not possible for the user to create a corrupt block which passes all possible SRCs. Larger seeds may however require more complex random number generators. The publisher may also be able to select the random number generation algorithm. Details of the algorithm or a pointer to information on it may be provided to the peers as part of the SRC series, within a content description or separately (e.g. at the same time as SRC series and content description).

If only one SRC series is generated and each peer is sent the same SRC series (K=N=1), this requires minimum processing power and for a 16-bit SRC, results in a low probability, (approximately $1/2^{16}$), of the SRC not detecting accidental corruption. If more SRC series are generated whilst still sending all series to all peers (K=N=x, where x>1) then the probability of the SRC not detecting the accidental corruption is reduced significantly (e.g. for 16-bit SRC, it is approximately $(1/2^{16})^K$). However, although such use of SRCs enables detection of accidental/random block corruption, it does not guard against malicious and intentional block corruption because each peer knows all the random seeds used to generate the SRC lists. This means that a malicious peer could create a corrupted block which passed all the SRCs and therefore would not be identified as corrupt by a recipient peer.

A solution to this would be to provide each peer with different SRCs so that a malicious peer would only know their own SRC. However, if a piece of content is distributed to very large numbers of peers in a relatively short period of time (e.g. 10 million people in one day), then generating and distributing huge numbers of SRC series (e.g. 10×10 million=100 million SRCS) would require huge computing resources, server storage requirements and network bandwidth. This would reduce the number of peers which could be handled by a single tracker. Furthermore as it is often not possible to predict the popularity of a particular piece of content in advance of its distribution, the publisher is unlikely to know how many SRCs to generate, leading to either the requirement for SRC generation during the content distribution process (see below) or the generation of very large numbers of SRCs for all content.

Another solution would be generation of SRCs on demand by the publisher (or another node, such as the tracker or the seed). These SRCs could then be distributed to peers by the generating node or alternatively they could be transmitted to, and stored by, another node (e.g. the tracker) for distribution to peers. Where the SRCs are generated by a first node (e.g. the publisher) and stored on a second node (e.g. the tracker), the publisher could generate and provide the SRCs in batches, with further batches being generated when the number of remaining new SRCs stored at the tracker falls below a threshold. The generation of SRCs is, however, computationally intensive and so this technique would therefore limit the other activities that the node could perform concurrently and also limit the numbers of peers that could be serviced by that node.

By selecting K series from N series (where K<N) and providing different peers with well-distributed selections of series (i.e. such that two peers are unlikely to be sent the same subset of series), a malicious peer cannot know all the SRC information (i.e. all the seeds and/or all the SRC values) and therefore cannot create a corrupted block which passes all the SRCs. In this situation, the possibility that a malicious user could create a corrupted block that would pass the SRC checks of one peer is very small whilst the possibility that the block would pass the SRC checks of two or more peers is significantly smaller. Consequently the chance of widespread poisoning of a content distribution cloud is extremely small. Further measures may also be taken to reduce the possibility that a malicious user could obtain details of all the SRC series, all the random streams or all the seeds used to generate the SRC lists. Such measures and the selection process are described in more detail below.

As the publisher 101 is depositing all the SRC series on the tracker 103, it may be beneficial for authentication to occur between the publisher and the tracker prior to the SRC series being deposited (e.g. prior to step 305 in FIG. 4). This enables the publisher to identify the tracker so as to reduce the likelihood of depositing the SRC series on a rogue tracker that would circulate all the SRC data freely. This also enables the publisher to block the tracker and not use them again in the future if they are ever found to have distributed the SRC data in a manner contrary to the rules provided by the publisher. In addition to performing authentication with the tracker 103, the publisher 101 may also authenticate with the seed 104 prior to depositing the content on the seed (e.g. prior to step 306).

Figure 6:
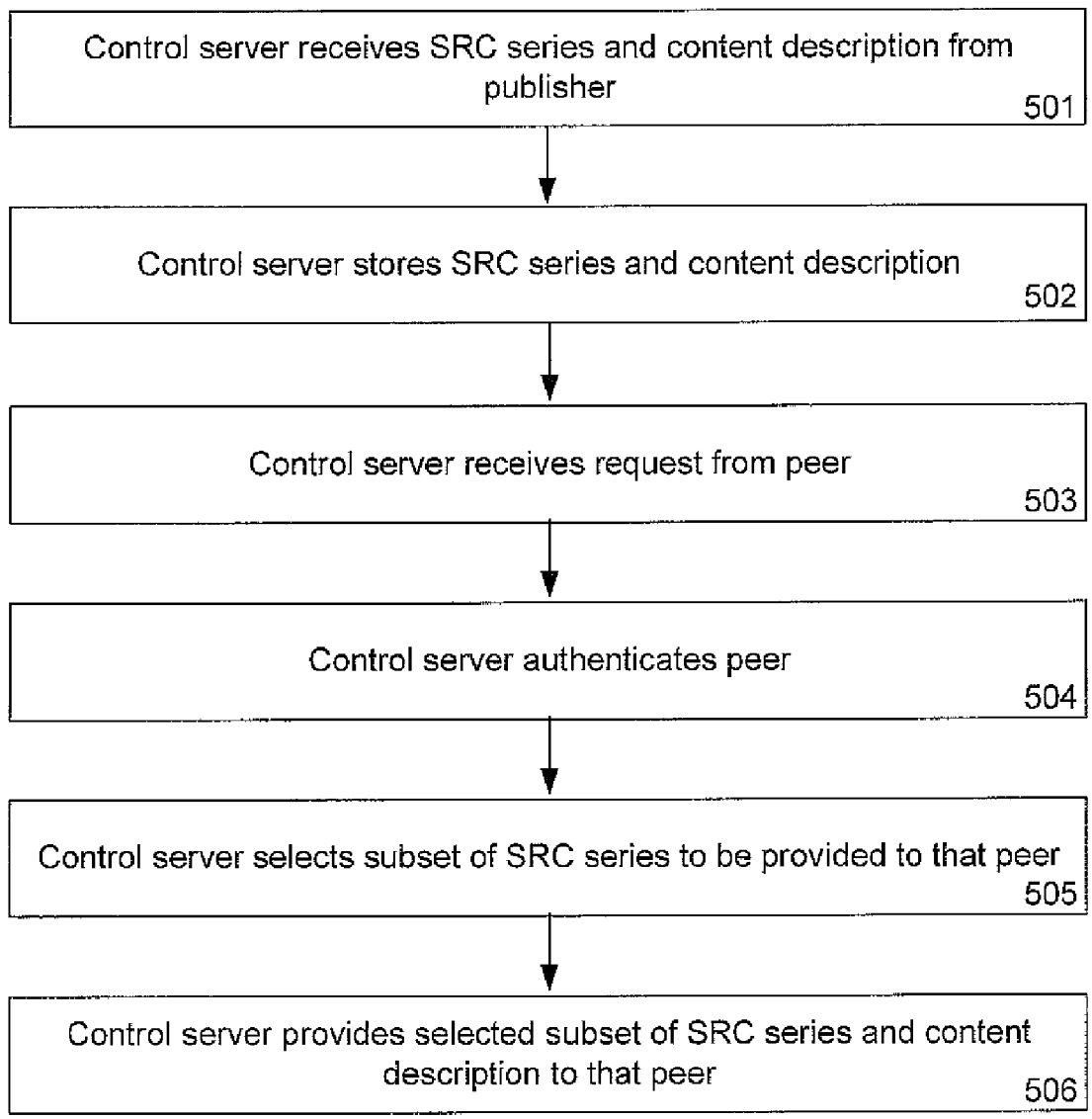
FIG. 6 shows an example flow diagram for the operation of a second node in the system of FIG. 1.

The operation of the tracker 103 can be described with reference to FIG. 6 which shows an example flow diagram and FIG. 7 which shows an example architecture for the tracker. The tracker 103 receives the many SRC series and the content description from the publisher 101 (step 501 via a transport interface 601. The tracker stores the SRC series in an SRC store 602 and the content description in a content description store 603 (step 502). As described above, the tracker may also receive information from the publisher relating to how the SRC series should be distributed amongst peers. This information may be stored in the SRC store 602 or elsewhere. Subsequently, when the tracker 103 receives a request from a peer 105 for information relating to the particular piece of content (step 503), the tracker authenticates the peer (step 504). Peer information may be stored in a registration information store 605 accessed via a registration interface 604. This authentication process may be a one way (tracker authenticating peer) or a two way (mutual) authentication process. This enables the tracker to identify the peer (e.g. using a unique host identifier), although they may not require specific authorisation to participate in a particular content distribution cloud. Having identified the peer, the identification information (e.g. the host identifier) may be used to select, control, restrict and/or record information provided to the peer. For example, if the peer is found to act in a detrimental manner, they can be blocked from participating further in the cloud. The peer identifier may be allocated to a peer for use in all situations (e.g. all clouds that they join) or may be allocated on a more regular basis (e.g. per cloud, per publisher, per network provider, per month etc). The authentication of the tracker with the peer may confirm to the peer that the tracker is authorised to distribute information relating to the specific publisher, the specific content or that they are authorised by a third party authorisation body.

Figure 9:
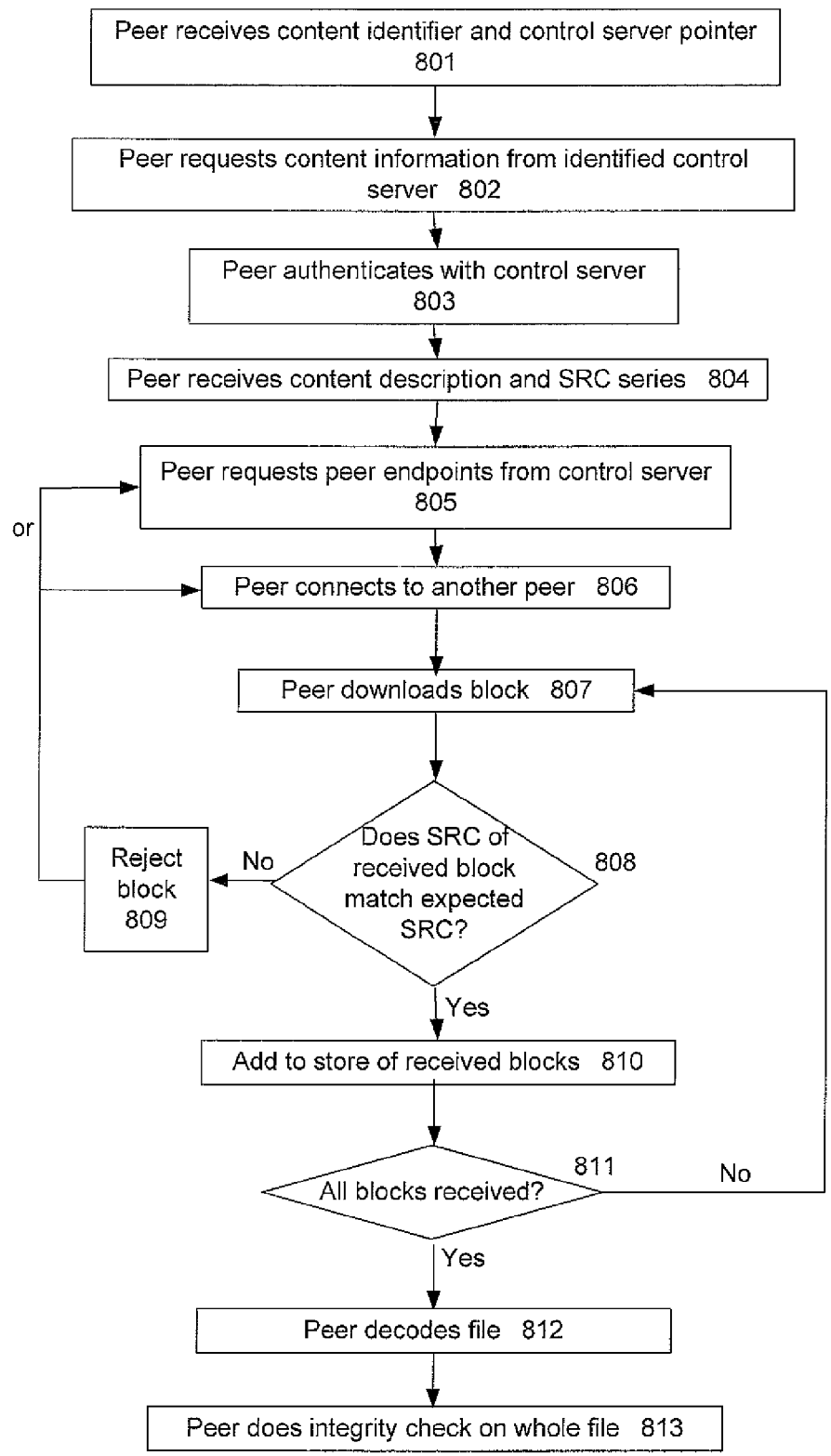
FIG. 9 shows an example flow diagram for the operation of a peer in the system of FIG. 1.

Having identified the peer making the request (in step 504), the tracker selects a subset of the stored SRC series for the particular piece of content (step 505). This selection step may be performed by a content information interface 606. This selection step is described in more detail below. Having selected the subset of SRC series (in step 505), the tracker provides the selected subset and the content description to the peer (step 506). The details of the peer may at this point, or subsequently when that peer has downloaded some of the content (e.g. after downloading the first block), be added to a list of peers that are actively participating in the content distribution cloud 205 (not shown in FIG. 6). The peer may be required to reregister with the tracker in order to be added to or to remain on the list of active peers in the cloud. This list enables the tracker to provide details of peers within a cloud to other peers upon request (as shown in FIG. 9 step 804).

Figure 7:
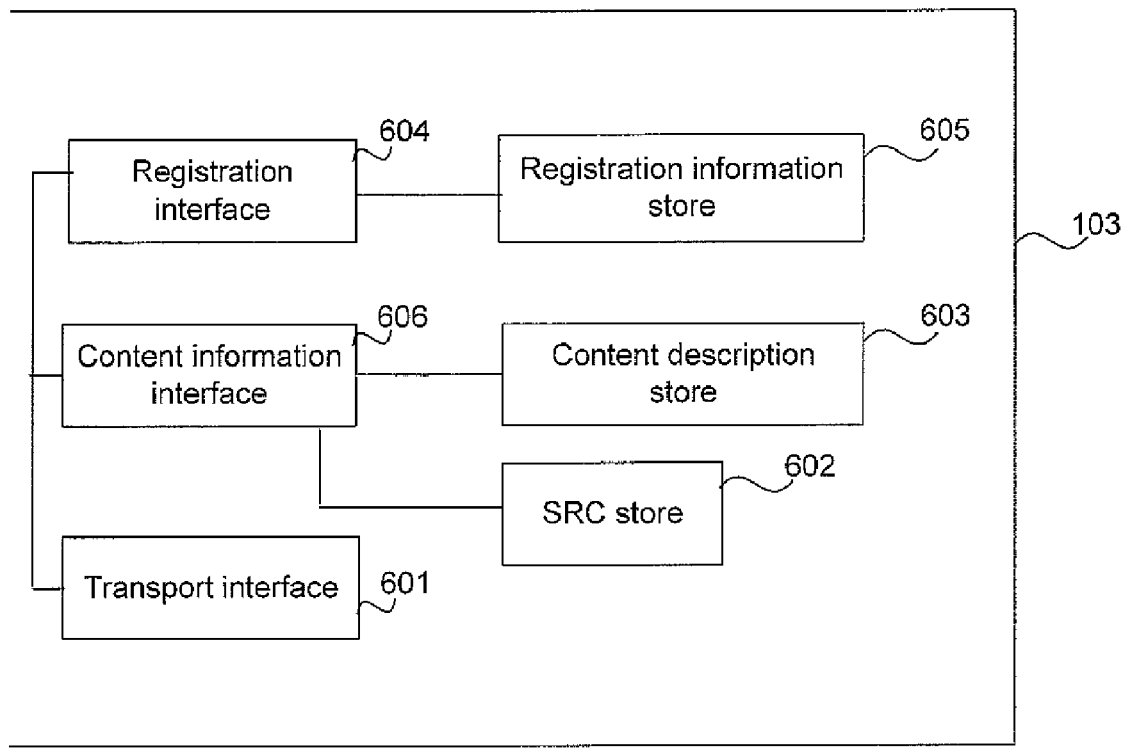
FIG. 7 shows an example architecture for a tracker.

Although the example architecture of FIG. 7 shows three separate information stores 602, 603, 605 it will be appreciated that some one or all of these may be combined. Furthermore, some or all of the interfaces 601, 604, 606 may be combined in other example architectures.

As described above, in addition to providing the tracker with the SRC series (in step 501), the publisher may also provide information on how the SRC series should be distributed to peers. This additional information may include the number, K, of SRC series which should be given to each peer and a method (e.g. a mapping function and a modifying function) to use to select the K SRC series from the total number, N, of SRC series generated by the publisher and stored on the server. Where this information is not provided by the publisher 201 it may be preset on the tracker 202 provided by another network entity or may be variable according to predefined criteria.

A first example of the selection method would be to select the K SRC series at random from all the N SRC series. A second example of the selection method would be to select K SRC series sequentially from the N SRC series, so that series 1 to K would be given in response to the first request for content information, series (K+1) to 2K would be given in response to the second request etc. In these examples, the selection of SRC series is not necessarily related to the peer that made the request. This may provide a simple selection process however, it may be beneficial to record which SRC series are provided to which peers and to restrict their access to further SRC series in some way. This assists in guarding against a malicious user making multiple requests for information in order to obtain as much SRC information as possible so as to enable them to create a corrupt block which passes the validity check and can therefore be propagated throughout a cloud, thus poisoning it. One suitable method would be to record which SRC series are provided to a peer and then to re-send the same series in response to any further requests in relation to the same piece of content. A second suitable method would be to limit the number of requests that are serviced for a particular peer, for example servicing only one request an hour or three requests in total relating to a particular piece of content. Another suitable method would be to limit the maximum number of SRC series which are sent to each peer, as described below.

Figure 8:
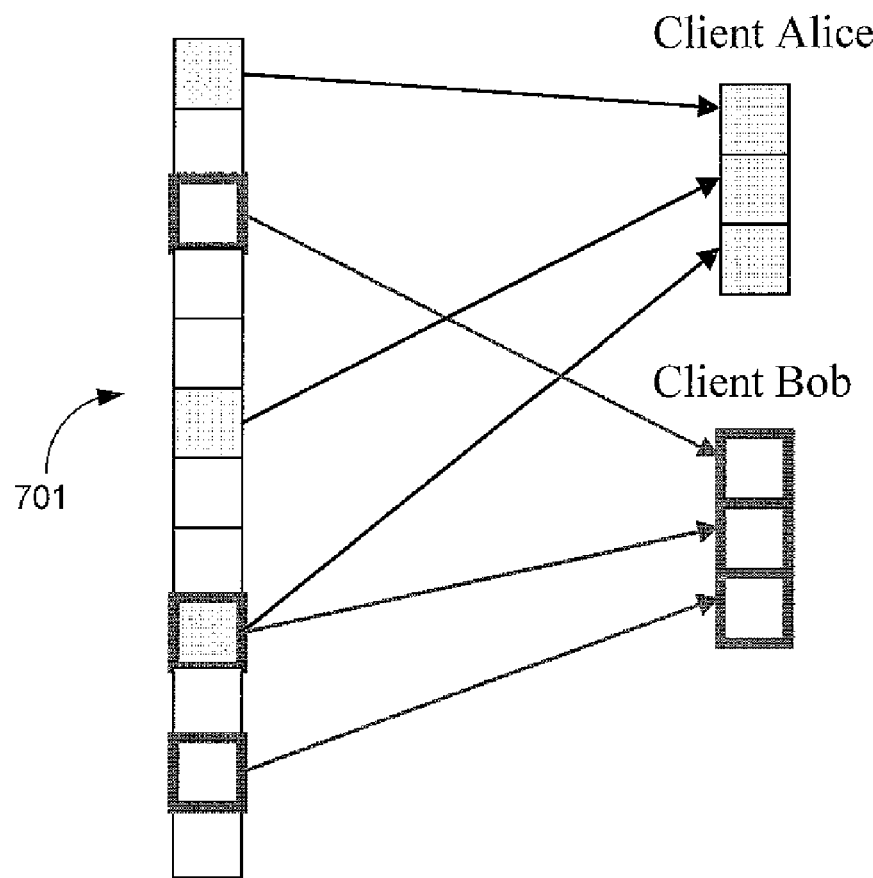
FIG. 8 shows a schematic diagram of the selection of SRC series for an example where N=12 and K=3.

FIG. 8 shows a schematic diagram of the selection of SRC series for the example where N=12 and K=3. When a first peer, Alice, requests SRC series from the tracker, her unique (and authenticated) ID (an identifier) is mapped using the specified function (i.e. the mapping function) to determine which 3 SRC series she is provided with (e.g. series 1, 6, and 9). When a second peer, Bob, requests SRC series from the tracker, his unique ID is mapped using the same specified function to determine which SRC series he is provided with (e.g. series 3, 9 and 11). Use of a specified function ensures that different peers are given different groups of SRC series (e.g. Alice and Bob are only given one SRC series in common). The function is preferably selected to provide a good distribution of SRC series between clients. Other examples of suitable mapping functions include an identity function (e.g. use the bits from the identifier in order), a truncation function (e.g. use the first/last bits) and a rotor function (e.g. first bit of every byte specifies the first SRC, the second bit of every byte specifies the second SRC etc). Further examples of mapping functions are described below.

When using the mapping function, the peer's identifier may be used directly, or alternatively a modified form of the identifier may be used. The peer's identifier may be modified using a modifying function which may be specified by the publisher (as detailed above) or selected by the tracker. A first example of a modifying function is the Secure Hash Algorithm-1 (SHA-1). The SHA-1 value of the peer's unique ID can be calculated and this value (referred to as the 'modified identifier') can be used in one of many different ways according to the mapping function to determine which K SRC series are selected. In a first example of a mapping function, sets of bits may be taken from the hash value of the client's ID (the modified identifier) and then K sets of bits are used to specify which K SRC series should be provided to that peer. In an example where K=10 and the hash value of the client's ID (the modified identifier) is in the form of a 160-bit number, this 160-bit number may be split into ten 16-bit numbers and each 16-bit number then used to identify an SRC series. In another example of a mapping function, the resultant hash value may be split to provide a starting position in the set of SRC series, (e.g. $10^{th}$ series in the set) and a number of step sizes to select the remaining series, (e.g. steps of 1, 5, 4, 7, 3, 2, 6, 4, 9 resulting in the selection of the $11^{th}$, $16^{th}$, $20^{th}$, $27^{th}$, $30^{th}$, $32^{nd}$, $38^{th}$, $42^{nd}$ and $51^{st}$ series). Use of a hash function as the modifying function, such as SHA-1 or MD5 (Message Digest 5), may be beneficial because a small change in data (i.e. a small change in the client's ID) results in a large change in hash value and hence should result in a large difference between the SRC series selected for the client. Use of a hash function is also beneficial because it ensures that the selection of SRC series is random, which may not necessarily be the case if the client ID or other identifier is used in its original form. This is because client IDs may all take the same general form and may be issued sequentially. Therefore two client IDs are likely to be similar whilst the hash values of client IDs are random. Furthermore, the size of the hash value may be smaller than the original data (e.g. the client's ID) which may make storage, use or transmission easier. Any suitable hash function may be used, although a hash function may be selected to give a suitable output bit length (e.g. $\geq 128$ bits).

Another example of a peer identifier is the peer's public key which may be identified from (or comprise) the peer's unique ID. The public key may be used in its original form or a modified form (e.g. the hash function of the public key) may be used. Again there are many ways in which this can be used to determine which K SRC series are selected, including, but not limited to, the techniques described above.

By using a mapping between data associated with the peer (e.g. the client's ID or their public key), the tracker can ensure that they provide the peer with the same subset of SRC series every time they request information about a particular piece of content. Alternatively, the tracker (or the publisher) may set a restriction, R, on the number of different SRC series that may be provided to a particular peer, where $R \geq K$, so that irrespective of how many requests are made by a single peer, they cannot obtain all the SRC series associated with a particular piece of content. In this example the peer may not necessarily be provided with the same subset of SRC series in response to each request, but an upper limit (equal to R SRC series) is set on the amount of SRC information provided to the peer. This restriction may form part of the mapping function.

In an example where there is a piece of content which 10 million clients want, suitable values for N and K may be 1000 and 10 respectively. This provides about $10^{23}$ (or $2^{76}$) unique SRC sets. According to the birthday paradox, there will be a 50% chance that there exists a single pair of peers with an identical subset of 10 SRC series when there are $10^{11}$ subsets distributed to peers. The chance of a malicious peer having the same subset of SRC series as any other of the 10 million peers is small. For example, if there are N SRC's and K are given to each peer, then an attacker must obtain (N/K) log N sets of randomly distributed SRCs on average to obtain all the SRCs.

The operation of a peer 105 can be described with reference to FIG. 9. The peer receives a content identifier and a tracker pointer (step 801). This information may be received from a website, URI (Uniform Resource Identifier) or as part of an application experience (e.g. as part of an Interactive Media Player, iMP). Using this information, the peer 105 can request a content description from the identified tracker 103 (step 802). As described above (in relation to FIG. 6 step 504), the peer authenticates with the tracker (step 803) before the tracker will provide the requested information. The peer receives the content description and K SRC series from the tracker (step 804). The peer is responsible for keeping the SRC series information secure. As the tracker and the peer have performed authentication (in steps 504 and 803), if the peer is found to be making the SRC information available to others, the tracker can block the peer from participating in the content distribution cloud (e.g. by deleting that peer from the list of active peers in the cloud).

If the content description does not contain peer endpoint information, the peer then requests details of peer endpoints from the tracker (step 805). These peer endpoints are details of one or more other peers which the peer can connect to in order to download the content. The peer endpoints may also include details of the seed 104, particularly in the early stages of a cloud 106 when there are not many peers within the cloud. The peer 105 then connects to one or more of the identified peer endpoints (step 806) and downloads a block of the content (step 807). Before adding the block to the peer's store of received blocks, forwarding the block to anyone else or using the block to create a newly encoded block, the integrity of the block is verified (step 808) by checking that the calculated SRCs of the received block matches the SRCs calculated using the SRC series provided by the tracker. A simplified example of this calculation (which is performed within a finite field, as described above) is shown below for K=2:

The received block comprises $\alpha A+\beta B$, where A and B are original uncoded blocks and $\alpha$ and $\beta$ are random coefficients.
The received block comprises bytes B1, B2 . . . , Bn
$1^{st}$ SRC series:
SRC list includes $SRC\text{-}A_1$ and $SRC\text{-}B_1$
The seed is used to calculate pseudo-random numbers $R1_1$, $R2_1 \ldots , Rn_1$
$SRC\text{-}new_1 = (B1.R1_1) + (B2.R2_1) + \ldots + (Bn.Rn_1)$
Check that $SRC\text{-}new_1 = \alpha(SRC\text{-}A_1) + \beta(SRC\text{-}B_1)$
$2^{nd}$ SRC Series:
SRC list includes $SRC\text{-}A_2$ and $SRC\text{-}B_2$
The seed is used to calculate pseudo-random numbers $R1_2$, $R2_2 \ldots , Rn_2$
$SRC\text{-}new_2 = (B1.R1_2) + (B2.R2_2) + \ldots + (Bn.Rn_2)$
Check that $SRC\text{-}new_2 = \alpha(SRC\text{-}A_2) + \beta(SRC\text{-}B_2)$ If the integrity of the block is found to be suspect, i.e. one or more of the calculated SRCs do not agree, the peer rejects the block and does not store it (step 809). The peer may also make a note of the offending peer endpoint and not contact it or accept connections from it for the remainder of the content distribution session (not shown). Instead, the peer will connect to another peer endpoint (step 806) and if necessary will first request further details of peer endpoints from the tracker 103 (step 805). If the integrity of the block is verified (in step 808), the peer adds the newly received block to its store of received blocks (step 810). The peer then determines whether it has received all the required blocks of the content (step 811). If it still requires additional blocks, it will proceed to download another block (step 807). Once the peer has downloaded all the required blocks of the content, the peer decodes the file (step 812) and does an integrity check on the whole downloaded file (step 813). Although this final step does not protect against cloud poisoning it is still a useful check that the content is that which the peer expects it to be. The integrity check may comprise a check of the calculated hash function of the downloaded file against a hash value contained within the content description. It is computationally unfeasible to create an entire content file which is corrupt but passes this test.

The examples described above use a 16-bit Galois field and 16-bit SRC by way of example only. Smaller or larger field and SRC sizes could be used instead. Use of larger field sizes is computationally more intensive but is more secure.

Although in the above description the same tracker 103 receives both the content description and the SRC series from the publisher 101 and then provides both to peers 105, these two functions may be performed by different trackers or different nodes. In an example of this, the publisher 101 may (in FIG. 4, step 305) deposit the content description on a first tracker and the SRC series on a second tracker. The first tracker would then receive the content description from the publisher (as in FIG. 6, step 501) and store the content description (step 502). In response to a request from a peer (in step 503), the first tracker would provide the content description to the peer (step 506). The first tracker would not perform the SRC selection step (step 505). Authentication may occur between the first tracker and the peer (step 504) prior to the provision of the content description or, if the content description is considered public information, authentication may occur at a later stage, before more sensitive information is provided to the peer (e.g. details of other peers in the cloud, which are provided to the peer by a tracker in response to the request shown in FIG. 9, step 805). If the first tracker does not provide any information to the peer which is considered sensitive, authentication may not occur at any stage. In this example, the second tracker would receive the SRC series from the publisher (step 501) and store them (step 502). In response to a request from a peer (in step 503) authentication would occur (step 504). The second tracker would select a subset of the SRC series to be provided to the authenticated peer (step 505) and then provide this subset to the peer (step 506). Maintenance of the list of active peers in the cloud may be performed by the first server, the second tracker, or by another node in the cloud. Where the SRC series are provided by a separate tracker to the content description, the peer may be provided with the location of or a pointer to the second server either in the content description or separately. In such an example, either the first or the second tracker could also perform the functions of the seed. In another example, the publisher could also perform the functions of the first and/or the second tracker.

It will be appreciated by the skilled person that the above examples are provided by way of explanation only and the particular functions could be performed by different network elements and a single network element could perform many functions. For example, SRC generation could occur at the seed, the publisher or any other node that held the entire uncoded content file. In another example, SRC selection and distribution could occur at the publisher, the seed or another node.

In the description above, SRC series are deposited by the publisher onto a single tracker 103, however it may be beneficial to deposit the information on more than one tracker. The information deposited on each server may be the same or different SRC series may be deposited on each tracker. Use of more than one tracker for storage, selection and distribution of SRC series reduces the possibility of bottlenecks caused by very large numbers of peers all requesting SRC information simultaneously and also provides redundancy in case of tracker failure. Where more than one such tracker is used, the trackers may operate such that one is the operating tracker whilst the other is the standby tracker operable only when the operating tracker fails. In another example, both trackers may be active at the same time and in this example peers may select one of the trackers at random for their initial connection and then should continue to communicate with that selected tracker in order to ensure continuity of registration.

Figure 10:
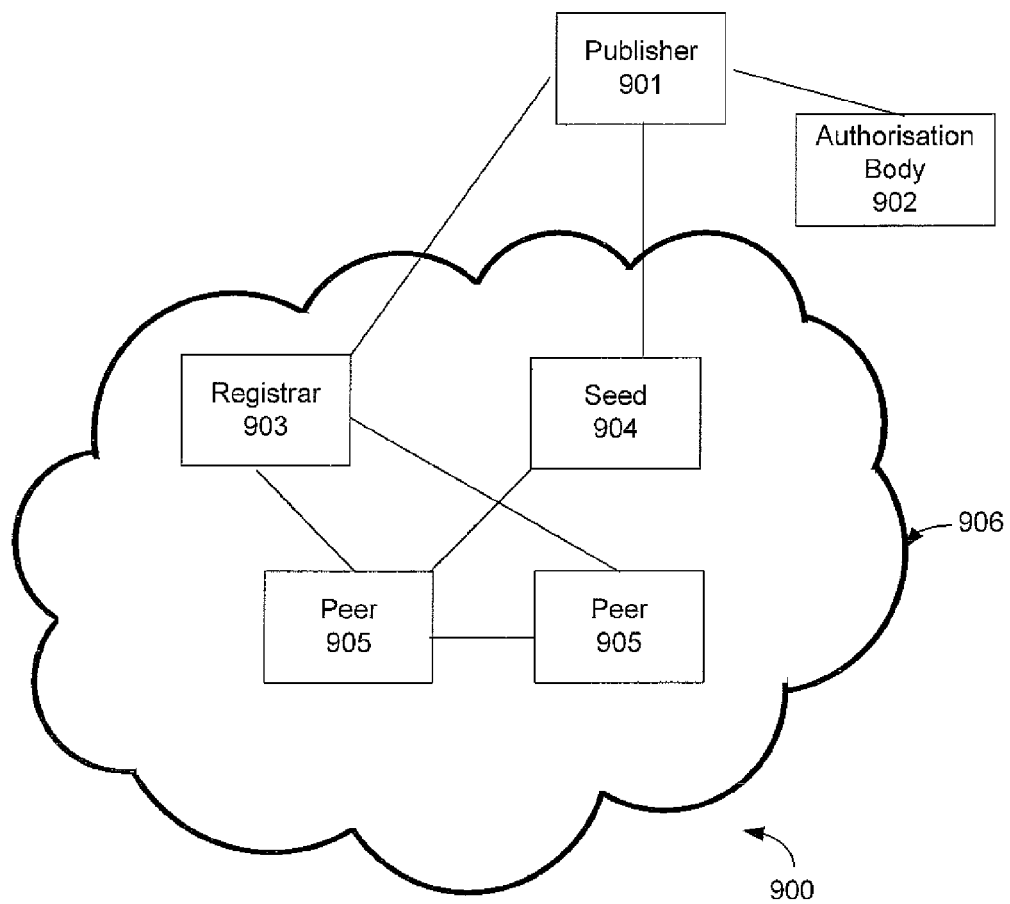
FIG. 10 is a schematic diagram of a second content distribution system.
Figure 11:
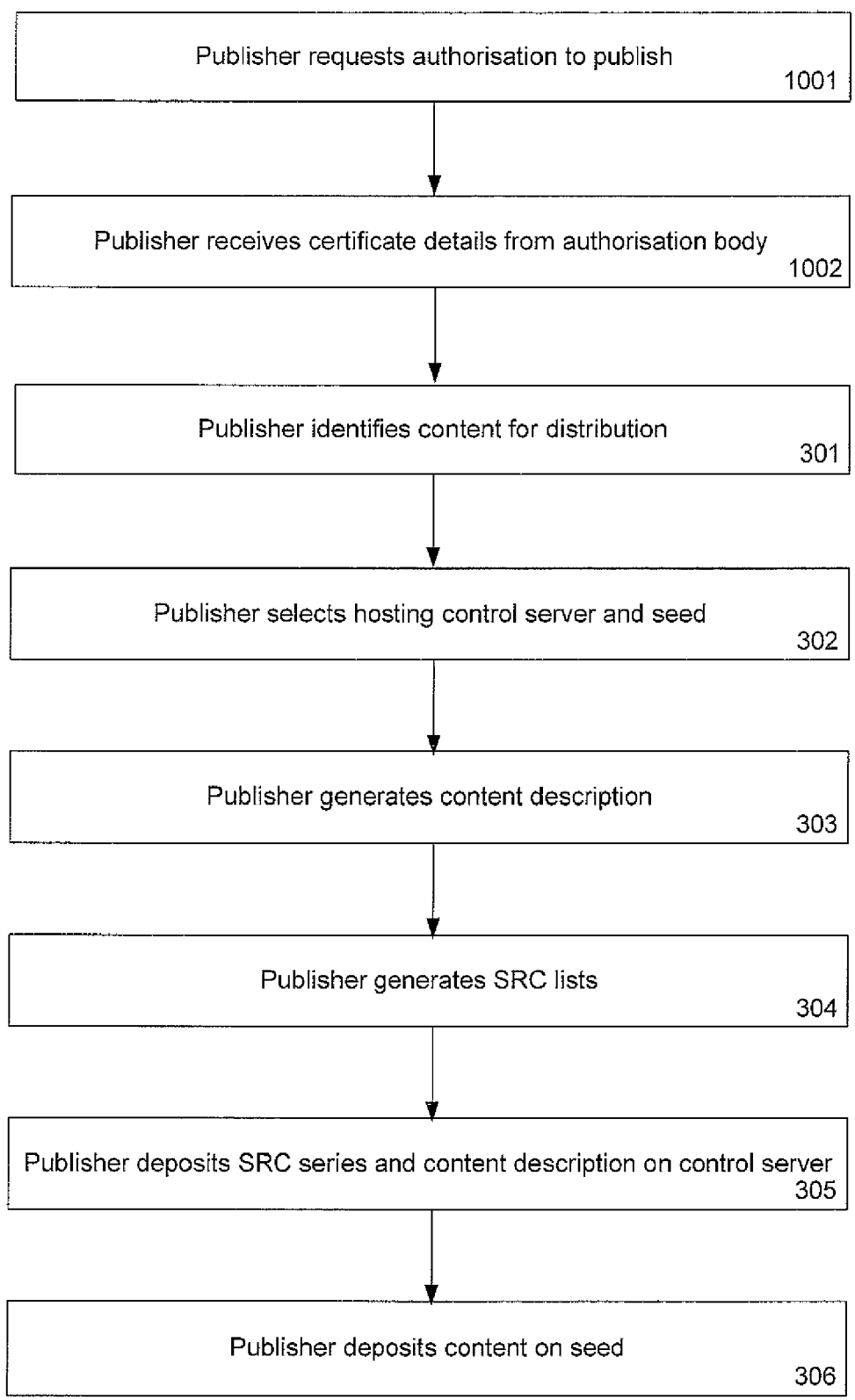
FIG. 11 shows an example flow diagram for the operation of a node in the system of FIG. 10.
Figure 12:
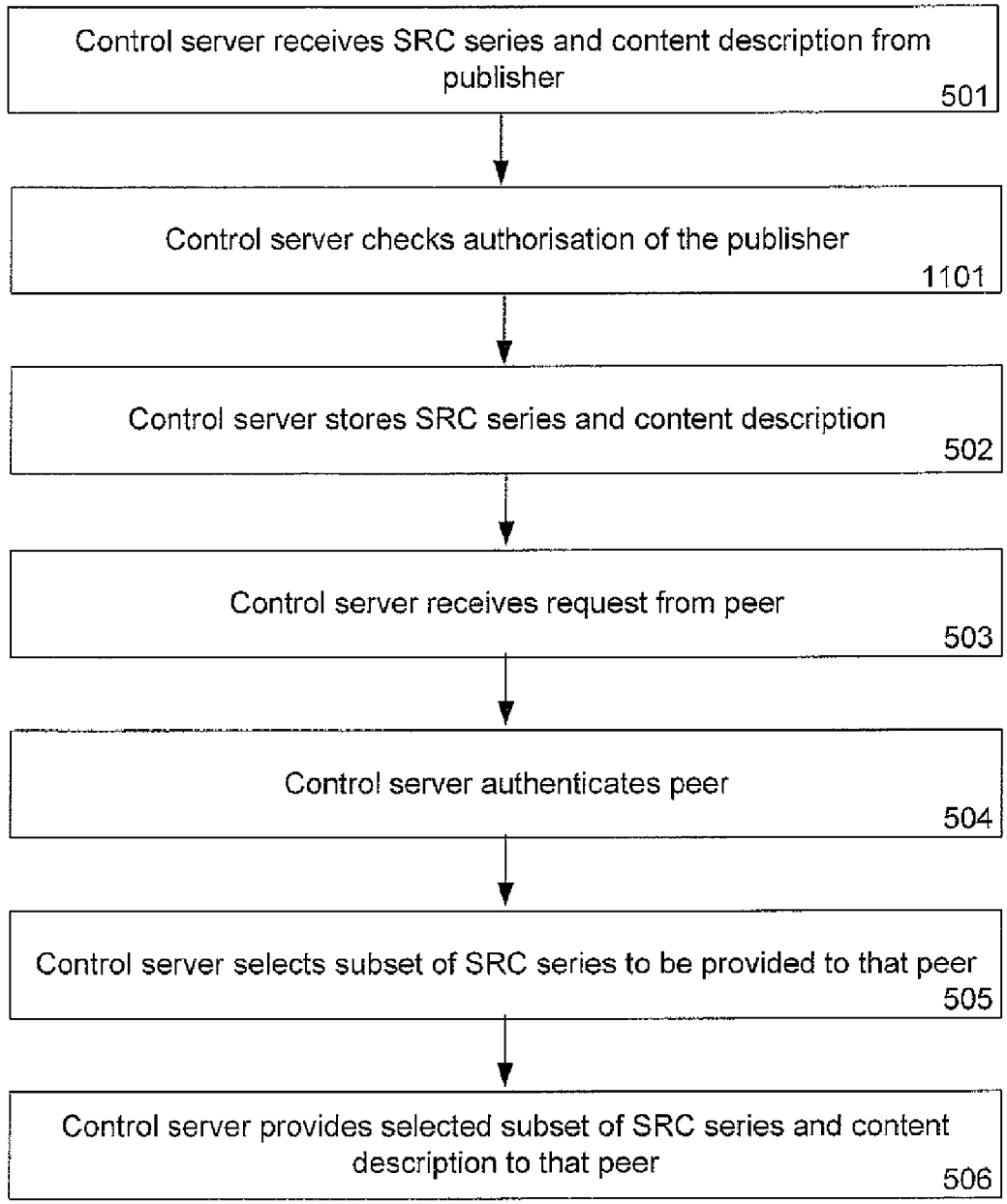
FIG. 12 shows an example flow diagram for the operation of a second node in the system of FIG. 10.
Figure 13:
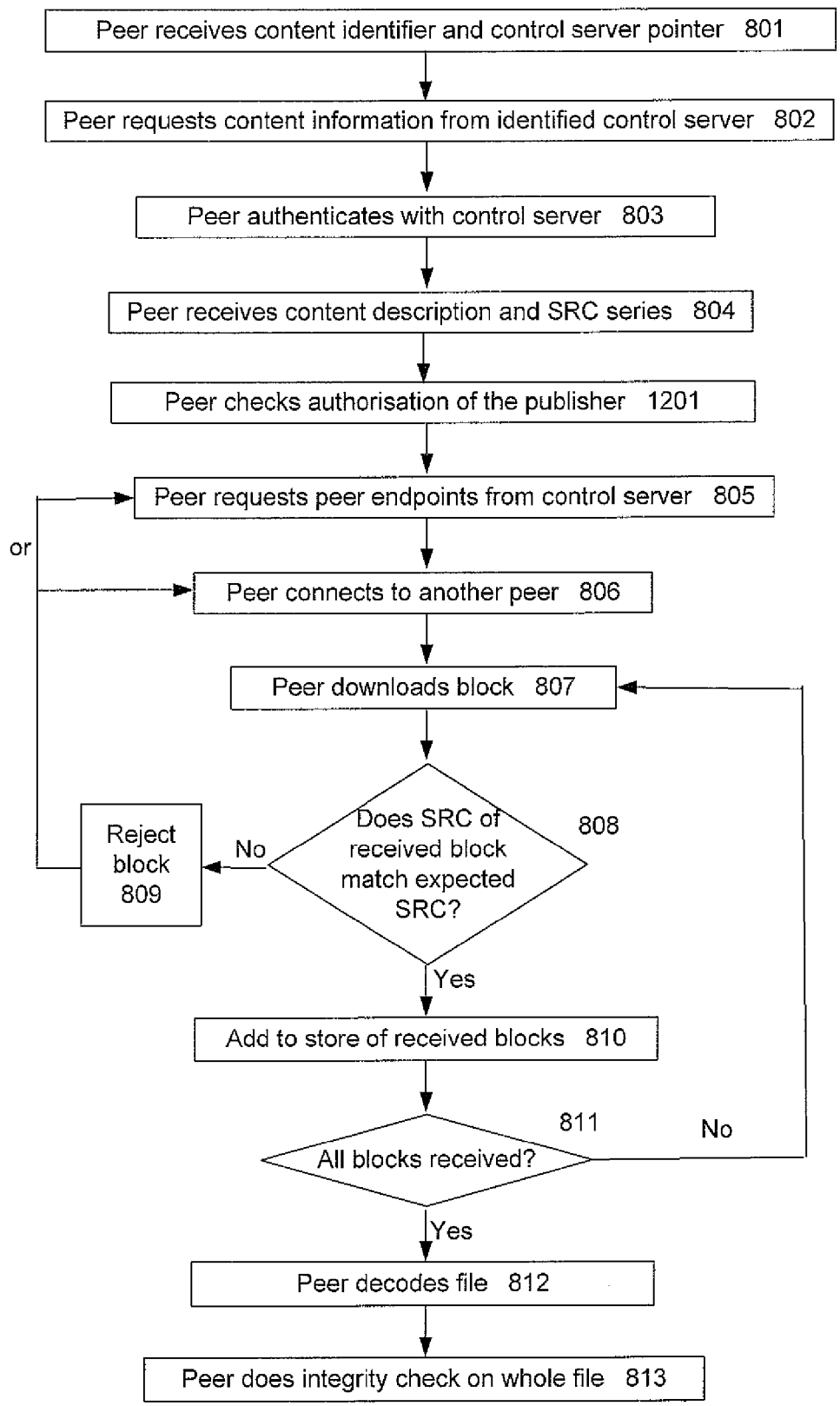
FIG. 13 shows an example flow diagram for the operation of a third node in the system of FIG. 10.

FIG. 10 is a schematic diagram of a content distribution system 900 developed by Microsoft (trade mark) which comprises a publisher 901, an authorisation body 902, a registrar (also referred to as a tracker) 903, a seed 904 and two peers 905. Content distribution occurs within the cloud 906. As with FIG. 2, FIG. 9 shows some logical connections between parts of the system 900, however those shown are not exhaustive and are for illustration only. For example, all entities within the system 900 may be aware of and receive data from the authorisation body 902. One example of the operation of the system 900 can be described with reference to FIGS. 11-13, which are modified versions of the flowcharts described earlier and shown in FIGS. 4, 6 and 9 respectively.

In this system 900, the publisher 901 is authorised by an authorisation body 902 (also referred to as a certification authority). The publisher 901 requests authorisation (step 1001) and in response a certificate is issued and the certificate, or details of the certificate, are provided to the publisher (step 1002). The publisher then identifies content for distribution (step 301) and selects a hosting tracker and seed (step 302). The tracker which helps peers find other peers participating in the cloud is called a registrar (or tracker) 903. The content description generated by the publisher (in step 303) in this example is a secure content description (SCD) which is digitally signed by the publisher 901. The SCD includes details of the certificate issued to the publisher (by the authorisation body 902) and information to enable integrity checking of the downloaded content. The publisher generates the SRC lists (step 304) and deposits the SRC series and the SCD on the registrar 903 (step 305). The content is deposited on the seed 904 (step 306).

The registrar receives the SRC series and the SCD (step 501) and may then check the certificate details of the publisher 901 (step 1101). This may be achieved by the registrar 903 confirming that the publisher 901 is not on the Certificate Revocation List (CRL) published by the entity that issued the certificate to the publisher, in this case the authorisation body 902 (also referred to as a certification authority (CA)). The CRL lists certificates that although previously issued have subsequently been revoked by the CA or delegate (i.e. by the certificate issuing entity). The registrar 903 may hold copies of CRLs locally, but ideally checks with CAs or their delegates for updated CRLs regularly (e.g. every 15 or 30 minutes) to minimise the window of vulnerability. The certificate chain in the SCD may include details of where the master CRL is located for each authorising entity (e.g. a url, IP address or other endpoint description). As anyone who can issue a certificate can also revoke certificates that they issued, it may be necessary to check more than one CRL (e.g. where the publisher is authorised by a delegate of a main authorisation body, it is necessary to check the delegate's CRL to confirm the authorisation of the publisher and then the main authorisation body's CRL to confirm the authorisation of the delegate). Having confirmed that the authorisation is still valid, the registrar stores the SRC series and SCD (step 502) and subsequently, when it receives a request from a peer (step 503), it authenticates the peer (step 504), selects a subset of the SRC series for that peer (step 505) and provides the selected subset and the SCD for the identified content to the peer (step 506).

The peer 905 receives a content identifier and tracker (or registrar) pointer, for example as part of an application they are running (step 801) and if they wish to obtain the particular piece of content, the peer requests content information from the registrar 903 (step 802). Having authenticated with the registrar (step 803), the peer receives the SCD and SRC series (step 804). On receipt of the SCD, the peer obtains information on the publisher's certificate chain (as described above). At this point, the peer may check that the publisher is still authorised (step 1201). This may be achieved by retrieving a Certificate Revocation List (CRL) issued by the authority which issued the certificate to the publisher to ensure that the publisher's certificate has not been revoked. As described above, a copy of the CRL may be stored at the registrar along with details of how up to date the CRL copy is. The peer may retrieve a copy of the CRL stored at the registrar or alternatively may retrieve a copy of the CRL master from the authorising body which issues the list (e.g. authorisation body 902). The peer may not necessarily download an updated CRL before every connection and may instead only download a new CRL when they join a new content cloud 906. By connecting to the registrar 903 to retrieve the CRL, rather than the certificate issuing body, the peer may avoid a potential bottleneck in the system. If a peer, when checking a CRL, identifies that the publisher of a piece of content has had their authorisation revoked, the peer may end its participation in the cloud and not download further blocks. The peer may also delete any blocks of the content that they have already received.

Publication of content using the content distribution system can be terminated passively or actively.

Natural, or passive termination of publication comprises waiting for an SCD associated with an item of content to expire That is, time information is associated with each SCD created by a publisher and any entity in the network using that SCD is arranged to check the time information. If the time information indicates expiry of the SCD then publication is discontinued.

In another example, natural, or passive termination of publication comprises waiting for expiry of any SRCs, hashes, checksums, homomorphic hashes or other data validation items distributed in the network. This expiry can be achieved in any suitable manner. For example, in the case that SRCs are generated, a lifespan is set on the SRCs, for example so that they all expire at a specified date. Alternatively, a time limit is set after which no further SRCs are to be generated.

It is also possible for a publisher to revoke publication of an item of content at any time by revoking an associated SCD certificate that it issued. The publisher notifies any trackers which it is working with of this revocation. This can be achieved by directly notifying those trackers, or by updating a certificate revocation list stored at any network location. Optionally the trackers can be notified that the certificate revocation list has changed and needs to be checked. It is also possible for the certificate revocation list (CRL) to be periodically checked by trackers and other nodes or for the CRL to be published. In this way the trackers treat the associated content as expired and without the trackers any peers cannot find new sources for the content.

Figure 14:
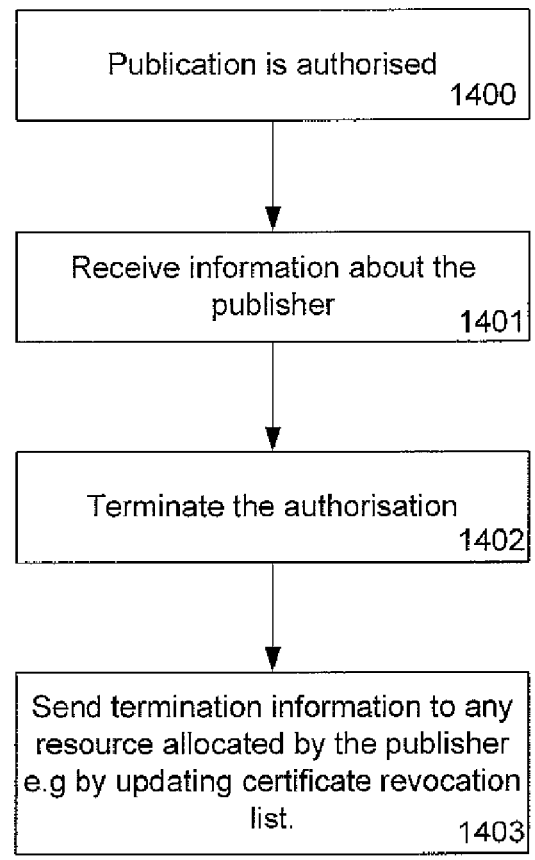
FIG. 14 is a flow diagram of revocation of a publisher.

In another example, an entire publisher can be revoked at any time. This is now described with reference to FIG. 14. The method is carried out by an authorization body or delegate of an authorization body. The publisher has already been authorized to publish (see step 1400) by the authorization body or delegate. Information is received about the publisher (step 1401) that indicates that the authorization should be terminated. For example, information about historical behavior of the publisher. This information can be received passively, for example, as a result of information sent in by peers, trackers or other entities. Alternatively, the information can be actively sought by monitoring activity in the cloud. The authorization body or delegate then terminates or revokes the authorization it previously issued to the publisher (step 1402). Any appropriate certificate revocation lists are updated accordingly and resources in the network such as trackers, seeds and or peers are able to access this certificate revocation list. In this way termination information is sent to any resources allocated by the publisher. As a result publication of any content by the publisher is prevented.

Figure 15:
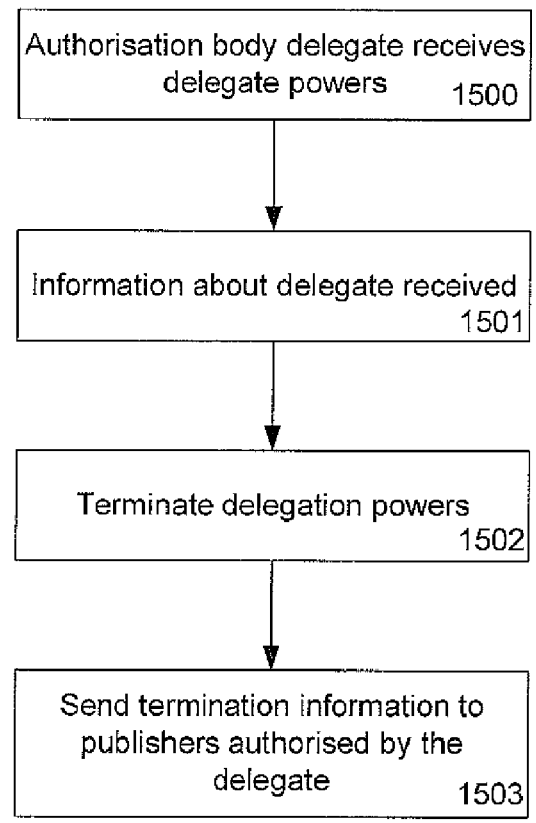
FIG. 15 is a flow diagram of revocation of an authorization body.

In another example an authorization body itself can be revoked in the case that it is a delegate. In this situation, the authorization body has been granted powers as a delegate (see box 1500 of FIG. 15). Information is received about the authorization body (see box 1501 of FIG. 115) which indicates that it should be revoked as a delegate. For example, this information is historical information about its behavior. The information is received in any suitable manner. The higher level authorization body which granted the delegation powers terminates those delegation powers in any suitable manner (see box 1502). For example, details of the termination are placed on a certificate revocation list. That list is accessible to any nodes in the content distribution cloud. Optionally, publishers which have been granted publishing authorization by the delegate are identified and actively informed of the termination or of the update to the certificate revocation list (see box 1503). Alternatively, the publishers discover this information as they make periodic checks of the certificate revocation list.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method implemented by a processor on a first computer executing instructions stored in machine readable form on a storage media, the method comprising:
   receiving, by the first computer, a content description of content to be distributed using a peer-to-peer content distribution system, wherein the content description includes information regarding a certificate issued by an authorization body to authorize a publisher to distribute the content, wherein the content is divided into a plurality of blocks for distribution using the peer-to-peer distribution system;
   receiving, by the first computer, a set of checksums for the content, the set of checksums comprising a plurality of series of checksums, wherein each series of the plurality of series of checksums includes at least one checksum generated for each block of the content, wherein the checksums are generated by using a known seed to generate a sequence of pseudo-random numbers, each of which is combined with a corresponding block of the content;
   receiving, at the first computer, a request from a second computer for information relating to the content;
   authenticating the second computer by the first computer, wherein the authenticating includes verifying an identity of the second computer;
   providing a subset of the plurality of series of the checksums and the content description to the second computer following authentication of the second computer, wherein the second computer uses the subset of the plurality of series of checksums to verify integrity of each of the blocks of the content;
   receiving, at the first computer, a request from a third computer for information relating to the content; and
   providing a different subset of the plurality of series of checksums to the third computer that includes at least one series of checksums that is different than the series of checksums provided to the second computer.

2. A method as claimed in claim 1, further comprising:
   generating the series of checksums by combining each pseudorandom number with the corresponding block by combining the sequence of pseudorandom numbers with a sequence of bytes for each uncoded block to create a list of checksums comprising one checksums for each uncoded block of the content.

3. A method as claimed in claim 1, further comprising storing an identifier at the first computer identifying the subset of the plurality of the series of checksums provided to the second computer for ensuring that a same subset of the plurality of series of checksums is provided to the second computer in response to a second request for information relating to the content received from the second computer.

4. A method as claimed in claim 1, further comprising receiving, by the first computer, instructions on how the series of checksums are distributed to peer computers, the instructions including how many series of the plurality of series are distributed to the peer computers.

5. A method as claimed in claim 1, further comprising receiving at the first computer a location of at least one seed node containing at least some of the content.

6. A method as claimed in claim 1, wherein the content description comprises the certificate for securing the content to protect against unauthorized consumption.

7. A method as claimed in claim 1, wherein the set of checksums for the content is generated by the publisher using a numerical seed combined with the plurality of blocks of the content for determining each series of checksums of the plurality of series of checksums.

8. A method as claimed in claim 1, wherein the first computer receives a copy of a certificate revocation list for comparison with the certificate issued by the authorization body to authorize a publisher to distribute the content.

9. A method as claimed in claim 1, further comprising:
   determining, by the first computer, from the content description, that the publisher is no longer authorized to distribute the content; and
   ceasing, by the first computer, to distribute the content description and information regarding location of the content.

10. A method as claimed in claim 1, wherein the content description for the content includes information about the content and information about the publisher of that content that is used by the first computer and/or the second computer for determining that the publisher is authorized to distribute the content.

11. A method as claimed in claim 10, wherein the first computer uses an identifier of the second computer mapped using a specified function for determining one or more series of checksums that make up the subset of the plurality of series of checksums provided to the second computer to ensure that a same subset of the plurality of series of checksums is provided to the second computer in response to a second request for information relating to the content received from the second computer.

12. A method as claimed in claim 11, wherein the subset of the series of checksums received by the second computer is used to verify the integrity of the one or more blocks of the content by checking that a calculated checksum calculated by the second computer matches a particular checksum in the subset of the series of checksums received by the second computer from the first computer.

13. A system comprising:
  a publishing computer including a storage medium containing instructions stored in a machine readable form adapted to be implemented by a processor on the publishing computer for:
    receiving authorization to publish content using a peer-to-peer content distribution system, the authorization including a certificate issued by an authorization body to authorize the publishing computer to distribute the content, wherein the content is divided into a plurality of blocks for distribution using the peer-to-peer distribution system;
    sending information about the content and the authorization to a tracker computer;
    calculating a plurality of series of checksums for the content, wherein the series of checksums includes at least one checksum generated for each block of the content, wherein the checksums are generated using a sequence of pseudo-random numbers which are combined with corresponding blocks of content; and
    sending the plurality of series of checksums to the tracker computer for distribution to peer computers for use by the peer computers in verifying integrity of the content following download, wherein the different peer computers receive different series of checksums.

14. A system as claimed in claim 13, wherein the publishing computer further implements:
  sending at least some of the content to at least one seed computer, and
  sending identification of the seed computer to the tracker computer with the information about the content and the authorization sent to the tracker computer.

15. A system as claimed in claim 13, wherein a certificate revocation list is distributed to the tracker computer for determining validity of the authorization of the publishing computer.

16. A system as claimed in claim 13 wherein the publishing computer implements:
  sending instructions to the tracker computer on how the series of checksums are distributed to peer computers, the instructions including how many series of the plurality of series are distributed to the peer computers.

17. A method implemented by a processor on a first computer executing instructions stored in machine readable form on a storage media, the method comprising:
  sending a request from the first computer to a second computer for obtaining information about content published using a peer-to-peer content distribution system, wherein the content is divided into a plurality of blocks for distribution using the peer-to-peer distribution system;
  receiving the information about the content at the computer, the information about the content including an authorization issued to a publisher to publish the content, a location of the content, and a plurality of checksum values for verifying integrity of the content, wherein the checksum values are generated using a sequence of pseudo-random numbers which are combined with corresponding blocks of the content;
  verifying the authorization of the publisher to publish the content;
  downloading the plurality of blocks of the content to the first computer;
  verifying integrity of each block of the content downloaded from the location using corresponding ones of the plurality of checksum values.

18. A method as claimed in claim 17 wherein the verifying the authorization of the publisher to publish the content comprises checking a certificate of the publisher against a certificate revocation list.

19. A method as claimed in claim 17 wherein, when one of the blocks fails verification of integrity, the first computer no longer accepts content from the location from which the block that failed verification was downloaded.

20. A method as claimed in claim 17, further comprising:
  in addition to verifying integrity of each block downloaded to the first computer using the plurality of checksums, assembling the plurality of blocks downloaded to the first computer to form assembled content; and
  verifying integrity of the assembled content by calculating a hash function for the assembled content and comparing the calculated hash function with a hash value received from the second computer.

* * * * *